(12) United States Patent
Gamble et al.

(10) Patent No.: US 8,297,369 B2
(45) Date of Patent: Oct. 30, 2012

(54) FIRE-EXTINGUISHING SYSTEM WITH SERVO MOTOR-DRIVEN FOAM PUMP

(75) Inventors: Jonathan Gamble, Taylors Falls, MN (US); Ron Flanary, Blacksburg, VA (US); Robert L. Hosfield, Centerville, MN (US); Harold McCabe, Roseville, MN (US); Martin Piedl, Radford, VA (US); Charles Ford, Blacksburg, VA (US); Troy Anderson, Blacksburg, VA (US)

(73) Assignee: Sta-Rite Industries, LLC, Delavan, WI (US)

( * ) Notice: Subject to any disclaimer, the term of this patent is extended or adjusted under 35 U.S.C. 154(b) by 537 days.

(21) Appl. No.: 12/555,714

(22) Filed: Sep. 8, 2009

(65) Prior Publication Data

US 2011/0056708 A1    Mar. 10, 2011

(51) Int. Cl.
A62C 35/00 (2006.01)
F04B 41/06 (2006.01)
F04B 49/00 (2006.01)

(52) U.S. Cl. ............... 169/15; 169/14; 417/3; 417/4; 417/22

(58) Field of Classification Search .......... 169/5, 13–15, 169/44; 417/1–6, 20, 22, 42; 137/88, 101.19, 137/101.21
See application file for complete search history.

(56) References Cited

U.S. PATENT DOCUMENTS

| | | |
|---|---|---|
| 1,334,461 A | 3/1920 | Kerr |
| 2,517,477 A | 8/1950 | Griffin |
| 2,601,899 A | 7/1952 | Boemer |
| 2,625,106 A | 1/1953 | Hoffman |
| 2,659,313 A | 11/1953 | Carson |
| 2,869,471 A | 1/1959 | Copeland |
| 3,213,800 A | 10/1965 | McAlvay et al. |
| 3,354,529 A | 11/1967 | James |
| 3,485,178 A | 12/1969 | Dutton et al. |
| 3,500,158 A | 3/1970 | Landau et al. |
| 3,611,081 A | 10/1971 | Watson |
| 3,687,151 A | 8/1972 | Krause et al. |
| 3,713,749 A | 1/1973 | Fitch |
| 3,776,659 A | 12/1973 | Coon, Jr. |
| 3,786,869 A | 1/1974 | McLoughlin |
| 3,796,507 A | 3/1974 | Smykal et al. |
| 3,812,409 A | 5/1974 | Dinger |
| 3,855,509 A | 12/1974 | Wright |
| 3,904,943 A | 9/1975 | Klang |
| 3,955,130 A | 5/1976 | Graf |
| 3,965,407 A | 6/1976 | Stoner |
| 3,974,357 A | 8/1976 | Saito et al. |

(Continued)

FOREIGN PATENT DOCUMENTS

EP    0638333    2/1995

(Continued)

*Primary Examiner* — Darren W Gorman
(74) *Attorney, Agent, or Firm* — Quarles & Brady LLP

(57) ABSTRACT

Embodiments of the invention provide a fire-extinguishing system for injecting foamant into a stream of water. The system can include a flow meter determining a flow rate of the stream of water and a foam pump having an inlet coupled to a supply of foamant and an outlet coupled to the stream of water. The system includes a servo motor driving the foam pump. The servo motor includes a sensor used to determine a rotor shaft speed and/or a rotor shaft torque. A controller can control an operating speed of the servo motor using closed-loop control depending on the flow rate and the rotor shaft speed and/or the rotor shaft torque.

28 Claims, 9 Drawing Sheets

U.S. PATENT DOCUMENTS

| | | | |
|---|---|---|---|
| 4,023,083 A | 5/1977 | Plunkett | |
| 4,037,664 A | 7/1977 | Gibson | |
| 4,064,891 A | 12/1977 | Eberhardt | |
| 4,078,189 A | 3/1978 | Nash et al. | |
| 4,078,191 A | 3/1978 | Morters et al. | |
| 4,180,768 A | 12/1979 | Ferraro | |
| 4,189,005 A | 2/1980 | McLoughlin | |
| 4,208,621 A | 6/1980 | Hipkins et al. | |
| 4,234,007 A | 11/1980 | Titone et al. | |
| 4,240,020 A | 12/1980 | Okuyama et al. | |
| 4,243,927 A | 1/1981 | D'Atre | |
| 4,246,969 A | 1/1981 | McLoughlin et al. | |
| 4,296,367 A | 10/1981 | Hirata | |
| 4,302,711 A | 11/1981 | Morser et al. | |
| 4,324,294 A | 4/1982 | McLoughlin et al. | |
| 4,355,274 A | 10/1982 | Bourbeau | |
| 4,358,726 A | 11/1982 | Iwakane et al. | |
| 4,387,329 A | 6/1983 | Harlow | |
| 4,447,771 A | 5/1984 | Whited | |
| 4,448,256 A | 5/1984 | Eberhardt et al. | |
| 4,474,680 A | 10/1984 | Kroll | |
| 4,499,413 A | 2/1985 | Izosimov et al. | |
| 4,503,377 A | 3/1985 | Kitabayashi et al. | |
| 4,526,234 A | 7/1985 | Little | |
| 4,554,939 A | 11/1985 | Kern et al. | |
| 4,599,550 A | 7/1986 | Robertson, Jr. et al. | |
| 4,608,527 A | 8/1986 | Glennon et al. | |
| 4,651,068 A | 3/1987 | Meshkat-Razavi | |
| 4,678,404 A | 7/1987 | Lorett et al. | |
| 4,712,050 A | 12/1987 | Nagasawa et al. | |
| 4,724,373 A | 2/1988 | Lipo | |
| 4,735,225 A | 4/1988 | Huveteau | |
| 4,768,923 A | 9/1988 | Baker | |
| 4,802,818 A | 2/1989 | Wiggins et al. | |
| 4,830,589 A | 5/1989 | Pareja | |
| 4,899,825 A | 2/1990 | Bosoni et al. | |
| 4,913,619 A | 4/1990 | Haentjens et al. | |
| 4,914,396 A | 4/1990 | Berthiaume | |
| 4,924,166 A | 5/1990 | Roussel | |
| 4,924,168 A | 5/1990 | Horie et al. | |
| 4,925,367 A | 5/1990 | Paliwoda et al. | |
| 4,942,344 A | 7/1990 | Devitt et al. | |
| 4,955,790 A | 9/1990 | Nakanishi et al. | |
| 4,968,925 A | 11/1990 | DeDoncker | |
| 4,993,495 A | 2/1991 | Burchert | |
| 5,009,244 A | 4/1991 | Grindley et al. | |
| 5,054,650 A | 10/1991 | Price | |
| 5,092,740 A | 3/1992 | Yamamura | |
| 5,105,143 A | 4/1992 | Marumoto et al. | |
| 5,118,008 A | 6/1992 | Williams | |
| 5,162,727 A | 11/1992 | Hindsberg et al. | |
| 5,166,593 A | 11/1992 | DeDoncker et al. | |
| 5,172,038 A | 12/1992 | Page et al. | |
| 5,174,383 A | 12/1992 | Haugen et al. | |
| 5,232,052 A | 8/1993 | Arvidson et al. | |
| 5,284,174 A | 2/1994 | Norman | |
| 5,313,548 A | 5/1994 | Arvidson et al. | |
| 5,332,954 A | 7/1994 | Lankin | |
| 5,334,923 A | 8/1994 | Lorenz et al. | |
| 5,335,734 A | 8/1994 | Scott et al. | |
| 5,344,515 A | 9/1994 | Chenock, Jr. | |
| 5,373,205 A | 12/1994 | Busick et al. | |
| 5,382,890 A | 1/1995 | Moh et al. | |
| 5,418,440 A | 5/1995 | Sakaguchi et al. | |
| RE35,010 E | 8/1995 | Price | |
| 5,442,268 A | 8/1995 | Goodarzi et al. | |
| 5,442,539 A | 8/1995 | Cuk et al. | |
| 5,467,004 A | 11/1995 | Matsuo et al. | |
| 5,476,015 A | 12/1995 | Valent | |
| 5,481,168 A | 1/1996 | Mutoh et al. | |
| 5,494,112 A | 2/1996 | Arvidson et al. | |
| 5,525,881 A | 6/1996 | Desrus | |
| 5,532,570 A | 7/1996 | Tajima et al. | |
| 5,540,192 A | 7/1996 | Xanders | |
| 5,558,249 A | 9/1996 | Falcoff | |
| RE35,362 E | 10/1996 | Arvidson et al. | |
| 5,616,869 A | 4/1997 | Valent | |
| 5,640,059 A | 6/1997 | Kammiller et al. | |
| 5,648,887 A | 7/1997 | Herndon et al. | |
| 5,704,767 A | 1/1998 | Johnson | |
| 5,710,500 A | 1/1998 | Matsuo et al. | |
| 5,727,933 A | 3/1998 | Laskaris et al. | |
| 5,764,463 A | 6/1998 | Arvidson et al. | |
| 5,765,644 A | 6/1998 | Arvidson et al. | |
| 5,777,447 A | 7/1998 | Okano | |
| 5,796,236 A | 8/1998 | Royak | |
| 5,803,596 A | 9/1998 | Stephens | |
| 5,811,957 A | 9/1998 | Bose et al. | |
| 5,816,328 A | 10/1998 | Mason et al. | |
| 5,823,219 A | 10/1998 | Purvis et al. | |
| 5,869,946 A | 2/1999 | Carobolante | |
| 5,881,818 A | 3/1999 | Lee et al. | |
| 5,909,775 A | 6/1999 | Grindley | |
| 5,923,135 A | 7/1999 | Takeda | |
| 5,923,141 A | 7/1999 | McHugh | |
| 5,936,377 A | 8/1999 | Blaschke et al. | |
| 5,971,704 A | 10/1999 | Blattmann | |
| 5,973,474 A | 10/1999 | Yamamoto | |
| 5,979,564 A | 11/1999 | Crabtree | |
| 5,995,710 A | 11/1999 | Holling et al. | |
| 6,008,589 A | 12/1999 | Deng et al. | |
| 6,009,953 A | 1/2000 | Laskaris et al. | |
| 6,013,999 A | 1/2000 | Howard et al. | |
| 6,014,006 A | 1/2000 | Stuntz et al. | |
| 6,016,042 A | 1/2000 | Miura et al. | |
| 6,055,359 A | 4/2000 | Gillett | |
| 6,084,376 A | 7/2000 | Piedl et al. | |
| 6,111,379 A | 8/2000 | Feldtkeller | |
| 6,170,241 B1 | 1/2001 | Shibilski et al. | |
| 6,183,562 B1 | 2/2001 | Pierce et al. | |
| 6,194,852 B1 | 2/2001 | Lovatt et al. | |
| 6,201,417 B1 | 3/2001 | Blum et al. | |
| 6,205,010 B1 | 3/2001 | Ohsaka et al. | |
| RE37,589 E | 3/2002 | Mueller | |
| 6,552,889 B1 | 4/2003 | Huang et al. | |
| 6,577,089 B1 | 6/2003 | Piedl et al. | |
| 6,599,086 B2 | 7/2003 | Soja | |
| 6,674,248 B2 | 1/2004 | Newman, Jr. et al. | |
| 6,674,260 B1 | 1/2004 | Harriman et al. | |
| 6,683,428 B2 | 1/2004 | Pavlov et al. | |
| 6,684,959 B1 | 2/2004 | Juidici et al. | |
| 6,703,809 B2 | 3/2004 | Royak et al. | |
| 6,710,505 B1 | 3/2004 | Barani et al. | |
| 6,725,940 B1 | 4/2004 | Klein et al. | |
| 6,747,300 B2 | 6/2004 | Nadd et al. | |
| 6,763,804 B2 | 7/2004 | Pursifull | |
| 6,766,863 B2 | 7/2004 | Arvidson et al. | |
| 6,831,429 B2 | 12/2004 | Fu | |
| 6,844,705 B2 | 1/2005 | Lai et al. | |
| 6,863,502 B2 | 3/2005 | Bishop et al. | |
| 6,870,348 B2 | 3/2005 | Mijalkovic et al. | |
| 6,886,639 B2 | 5/2005 | Arvidson et al. | |
| 6,917,184 B2 | 7/2005 | Lai et al. | |
| 6,979,181 B1 | 12/2005 | Kidd | |
| 6,982,533 B2 | 1/2006 | Seibel et al. | |
| 6,998,820 B2 | 2/2006 | Lai et al. | |
| 7,037,069 B2 | 5/2006 | Arnold et al. | |
| 7,095,209 B2 | 8/2006 | Thunes et al. | |
| 7,106,130 B2 | 9/2006 | Gan et al. | |
| 7,141,954 B2 | 11/2006 | Lai et al. | |
| 7,193,385 B2 | 3/2007 | Emadi et al. | |
| 7,248,009 B1 | 7/2007 | Sundquist | |
| 7,304,447 B2 | 12/2007 | Hirai et al. | |
| 7,318,422 B2 | 1/2008 | Douyama et al. | |
| 7,318,483 B2 | 1/2008 | Arvidson et al. | |
| 7,336,464 B1 | 2/2008 | Potanin et al. | |
| 7,337,857 B2 | 3/2008 | Vonhof et al. | |
| 7,387,348 B2 | 6/2008 | Archer et al. | |
| 7,544,041 B2 | 6/2009 | Mayleben et al. | |
| 2003/0020436 A1 | 1/2003 | Coles et al. | |
| 2004/0050556 A1 | 3/2004 | Baker et al. | |
| 2004/0055762 A1* | 3/2004 | Arvidson et al. | 169/14 |
| 2004/0081381 A1 | 4/2004 | Bureaugard et al. | |
| 2004/0232872 A1 | 11/2004 | Sunaga et al. | |
| 2005/0024001 A1 | 2/2005 | Donnelly et al. | |
| 2005/0045345 A1 | 3/2005 | Arvidson et al. | |
| 2005/0222287 A1 | 10/2005 | Roberts | |

| | | |
|---|---|---|
| 2005/0264972 A1 | 12/2005 | Boulesteix et al. |
| 2005/0281681 A1 | 12/2005 | Anderson et al. |
| 2006/0176059 A1 | 8/2006 | Mir et al. |
| 2006/0255751 A1 | 11/2006 | Chitta et al. |
| 2006/0275162 A1 | 12/2006 | Mayleben et al. |
| 2007/0246230 A1 | 10/2007 | Roberts |
| 2007/0247091 A1 | 10/2007 | Maiocchi |
| 2008/0035201 A1 | 2/2008 | Roberts |
| 2008/0131289 A1 | 6/2008 | Koehl |
| 2008/0167769 A1 | 7/2008 | Loudot et al. |
| 2008/0173358 A1 | 7/2008 | Guldi |
| 2008/0224639 A1 | 9/2008 | Balsiger |
| 2008/0232988 A1 | 9/2008 | Schaupp |
| 2008/0236846 A1 | 10/2008 | Gamble et al. |
| 2009/0058302 A1 | 3/2009 | Nerone |
| 2009/0095492 A1* | 4/2009 | Waters et al. .................. 169/14 |
| 2009/0309531 A1 | 12/2009 | Hamahata |

FOREIGN PATENT DOCUMENTS

| WO | WO 94/26353 | 11/1994 |
|---|---|---|

* cited by examiner

FIRE-EXTINGUISHING SYSTEM WITH SERVO MOTOR-DRIVEN FOAM PUMP

BACKGROUND

Modern fire fighting apparatus use a foam proportioning system (FPS) to extinguish fires with a water-foamant solution. A constant concentration of a water-foamant solution is desired for the most effective fire-extinguishing properties. Generally, the FPS can include additive pumps, which can be driven by different power sources including, for example, electric motors or hydraulic motors. For high flow rates, hydraulic motors are used due to excessive power requirements of an equivalent electric motor. The hydraulic pressure driving the hydraulic motor often varies over the period of the fire-fighting operation. As a result, hydraulic motors are less suitable for low-volume flows, because a steady stream of water-foamant solution can be difficult to provide. In addition to the hydraulic motor in the FPS, a direct current (DC) electric motor is often used to provide the low-volume flow rates.

SUMMARY

Embodiments of the invention provide a fire-extinguishing system for injecting foamant into a stream of water. The system can include a flow meter determining a flow rate of the stream of water and a foam pump having an inlet coupled to a supply of foamant and having an outlet coupled to the stream of water. The system includes a servo motor driving the foam pump. The servo motor can include a sensor used to determine rotor shaft speed and/or rotor shaft torque. A microprocessor can control an operating speed of the servo motor using closed-loop control depending on the flow rate and the rotor shaft speed and/or the rotor shaft torque.

DETAILED DESCRIPTION

Figure 1:
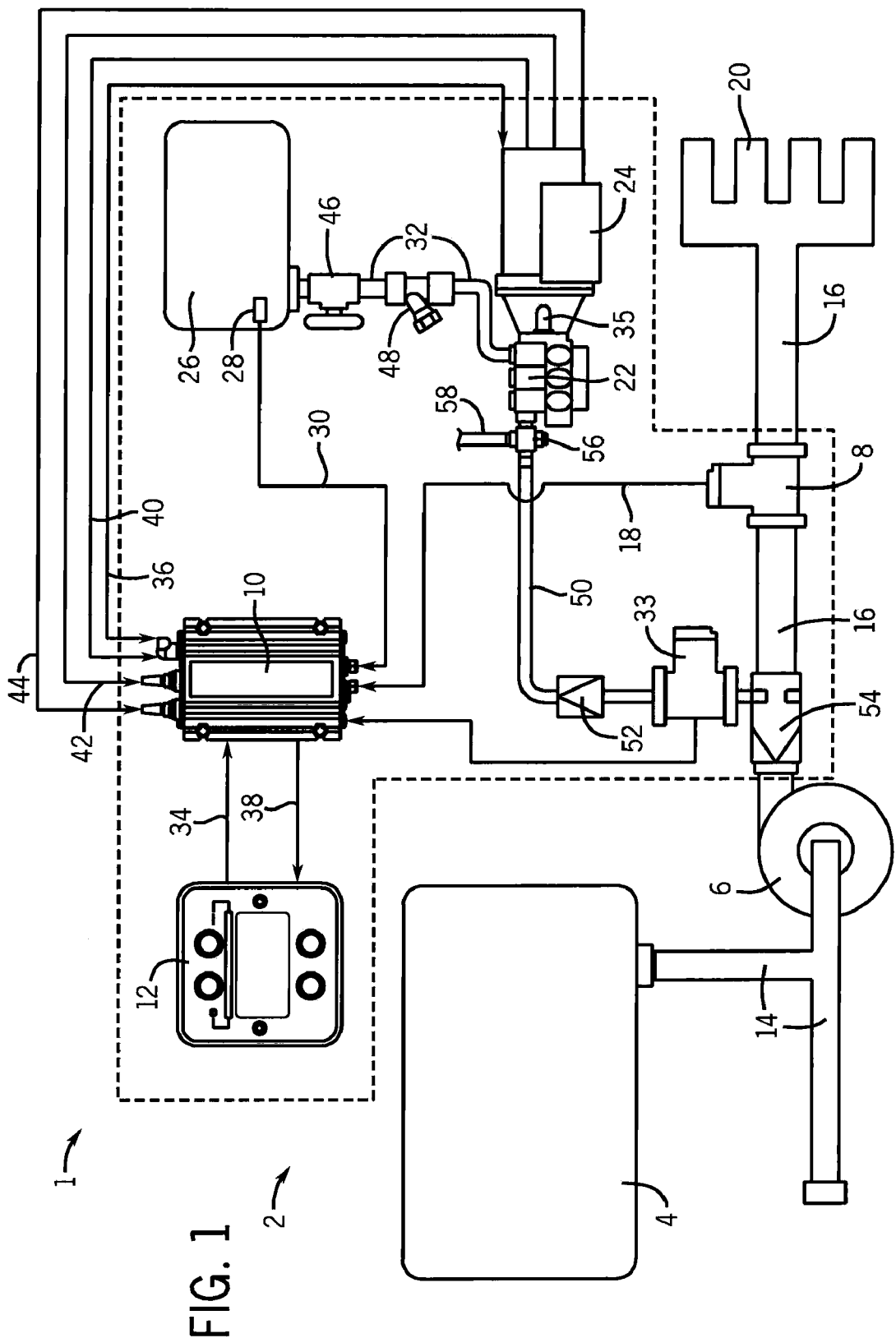
FIG. 1 is a schematic diagram of a fire-extinguishing system including a servo motor and having a foamant injection point upstream of a flow meter according to one embodiment of the invention.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures depict selected embodiments and are not intended to limit the scope of embodiments of the invention. Skilled artisans will recognize the examples provided herein have many useful alternatives and fall within the scope of embodiments of the invention.

Figure 5:
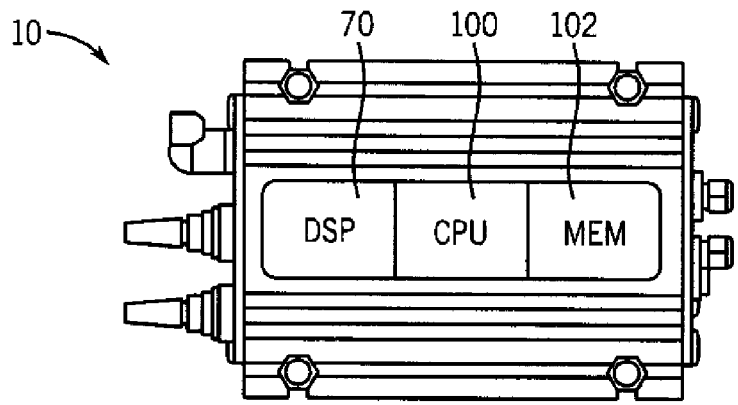
FIG. 5 is a schematic diagram of a controller for use with any one of the fire-extinguishing systems of FIGS. 1, 2, and 3.

The following description refers to elements or features being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the schematic shown in FIG. 5 depicts one example arrangement of processing elements, additional intervening elements, devices, features, or components may be present in an actual embodiment (assuming that the functionality of the system is not adversely affected).

The invention may be described herein in terms of functional and/or logical block components and various processing steps. It should be appreciated that such block components may be realized by any number of hardware, software, and/or firmware components configured to perform the specified functions. For example, an embodiment may employ various integrated circuit components, e.g., memory elements, digital signal processing elements, logic elements, look-up tables, or the like, which may carry out a variety of functions under the control of one or more microprocessors or other control devices.

In accordance with the practices of persons skilled in the art of computer programming, the invention may be described herein with reference to symbolic representations of operations that may be performed by the various computing components, modules, or devices. Such operations are sometimes referred to as being computer-executed, computerized, software-implemented, or computer-implemented. It will be appreciated that operations that are symbolically represented include the manipulation by the various microprocessor devices of electrical signals representing data bits at memory locations in the system memory, as well as other processing of signals. The memory locations where data bits are maintained are physical locations that have particular electrical, magnetic, optical, or organic properties corresponding to the data bits.

FIG. 1 illustrates a fire-extinguishing system 1 according to one embodiment of the invention. The fire-extinguishing system 1 can be stationary (e.g., a sprinkler system of a building) or mobile (e.g., installed on a fire truck). In other embodiments, the fire-extinguishing system 1 can be used to help prevent fires by protecting buildings or by providing exposure protection. The fire-extinguishing system 1 can include a foam proportioning system (FPS) 2, a water tank 4, a water pump 6, a flow meter 8, a controller 10, and a display 12. The water pump 6 can receive water from the water tank 4 and/or other sources (e.g., a lake, a stream, or a municipal hydrant). The water can be fed through a hose or other conduit 14 to the inlet of the water pump 6, which can be driven by a suitable motor or engine, such as an electrical motor, an internal combustion engine, or a hydraulic motor. The water pump 6 can be a high-pressure, high-flow rate pump. The outlet of the water pump 6 can be connected by a suitable conduit 16 to the flow meter 8. The flow meter 8 can generate a signal transmitted via a line 18 that is proportional to the volume flow rate of the total flow through the conduit 16. The FPS 2 can introduce an amount of foamant into the water stream to create a water-foamant solution at a desired concentration rate. The term "foamant" as used herein and in the appended claims can include any one or more of the following: liquid chemical foams, concentrates, water additives, emulsifiers, gels, and additional suitable substances.

Downstream of the flow meter 8, the pumped water can be routed to a discharge manifold 20. In one embodiment, a single discharge line (e.g., a single fire hose or a sprinkler head) can be connected to the discharge manifold 20. Other embodiments can include two or more discharge lines configured to dispense the water-foamant solution at substantially equal concentrations. In some embodiments, the fire-extinguishing system 1 can include two or more individual discharge lines with one discharge line dispensing the water-foamant solution at a different concentration than another discharge line.

As also shown in FIG. 1, the FPS 2 can include a foam pump 22, a servo motor 24, and a foam tank 26. The foam pump 22 can be a positive displacement pump or any other suitable type of pump. For example, the foam pump 22 can be a plunger pump, a diaphragm pump, a gear pump, or a peristaltic pump. The foam tank 26 can store a supply of foamant, which can be in liquid form. In some embodiments, the foam tank 26 can include a float mechanism 28 or another suitable type of level-sensing device. The float mechanism 28 can generate a signal transmitted via a line 30 to the controller 10. The signal can indicate that the amount of the foamant remaining in the foam tank 26 has dropped below a preset level. The foam tank 26 can be coupled by a hose or other suitable conduit 32 to an inlet of the foam pump 22 so that the foamant can be gravity-fed to the foam pump 22. However, in other embodiments, the foamant can be drawn against gravity into the foam pump 22. In some embodiments, the conduit 32 can be at least somewhat flexible to compensate for vibrations of the foam pump 22, reducing the risk of a fatigue rupture. In some embodiments, the FPS 2 can include a second flow meter 33 that can measure the amount of foamant being injected into the stream of water. In some embodiments, the second flow meter can measure the amount of foamant injected rather than or in addition to calculating the amount of foamant injected based on the displacement of the foam pump 22.

The foam pump 22 can include different cylinders with varying piston size and/or stroke to adapt to a wide range of flow rates. The amount of the foamant drawn from the foam tank 26 and pumped through the conduit 32 can be proportional to the stroke volume of each cylinder and to the speed at which the foam pump 22 is driven by the servo motor 24.

In some embodiments, the rotor shaft angle of the servo motor 24 can be used to calculate the position of a piston 35 of the foam pump 22. Under normal operating conditions, the calculated position of the piston of the foam pump 22 can be used to alter a rotor shaft speed of the servo motor 24. The use of a calculated piston position to alter the rotor speed is disclosed in U.S. Pat. No. 6,979,181 issued to Kidd, the entire contents of which is herein incorporated by reference. If the position of the piston is close to finishing a stroke in either direction (i.e., the movement of the piston is about to change to the opposite direction), the controller 10 can increase the rotor shaft speed by an increment. Conversely, when the piston is moving in a single direction without an imminent direction change, the rotor shaft speed can be decreased by an increment by the controller 10. As a result, foamant can be introduced in a more steady manner and power peaks of the servo motor 24 can be leveled off, reducing its power consumption and heat generation. In this manner, smoother and higher flow rates over extended periods of time can be achieved.

In some embodiments, the display 12 can serve as a user interface to allow communication with the controller 10 via a line 34. The display 12 can communicate a concentration of the water-foamant solution selected by the user to the controller 10. The controller 10 can include the selected concentration of the water-foamant solution to calculate a foam-flow rate at which the foamant should be injected into the stream of water. In order to achieve the necessary foam-flow rate, the controller 10 can send a corresponding speed signal to the servo motor 24 via a line 36. If the servo motor 24 operates the foam pump 22 at its maximum speed, the servo motor 24 can continue to run at the maximum speed, even if the flow rate through the conduit 16 requires a higher foam flow rate, thereby decreasing the selected concentration of the water-foamant solution. In some embodiments, the display 12 can also receive information regarding the status of the fire-extinguishing system 1 and other operating information from the controller 10 via a line 38 (e.g., current flow rates of water or foamant, the amount of total water or total foamant that was pumped during the current fire-fighting operation, etc.).

The controller 10 can communicate with the servo motor 24. In some embodiments, the servo motor 24 can transmit to the controller 10 the rotor shaft speed signal via the line 36, a current signal via a line 40, a temperature signal via a line 42, and a rotor shaft angle signal via a line 44. In some embodiments, the rotor shaft speed can be transmitted to the controller 10 (via line 36) and the rotor shaft torque can be calculated by the controller 10 based on the current signal received on the line 40. The controller 10 can operate the servo motor 24 based on the received signals and/or user input.

As further shown in FIG. 1, the FPS 2 can include a shut-off valve 46, a line strainer 48, a conduit 50, a first check valve 52, and a second check valve 54. The shut-off valve 46 and the line strainer 48 can be positioned along the conduit 32. The shut-off valve 46 can allow flushing of the foam pump 22 without having to drain the foam tank 26. The shut-off valve 46 can either be manually or electrically operated. Downstream of the shut-off valve 46, the line strainer 48 can prevent unwanted particles, such as dirt and sand, from reaching the inlet of the foam pump 22. In some embodiments, the line strainer 48 can be used to supply water for flushing residual foamant from the foam pump 22. Flushing the foam pump 22 can help the FPS 2 be more reliable, because residual foamants can otherwise corrode the metal components of the foam pump 22.

The conduit 50 can couple an outlet of the foam pump 22 to the conduit 16 carrying the stream of water. The first check valve 52 can be positioned along the conduit 50 and can prevent water from reaching the foam pump 22. The second check valve 54 can connect the conduit 50 to the conduit 16. The second check valve 54 can prevent foamant from flowing into the water pump 6 and any additional equipment upstream of the water pump 6 (e.g., the water tank 4). If no foamant is introduced during a fire-fighting operation, the second check valve 54 can prevent a backflow of water into the water pump 6, so that the water can be forced to exit through the manifold 20. In some embodiments, an injector fitting (not shown) can connect the conduit 50 with the conduit 16. The injector fitting can introduce the foamant coming from the conduit 50 into substantially the center of a cross section of the conduit 16. The injector fitting can result in enhanced mixing of the foamant with the stream of water.

In some embodiments, the FPS 2 can include a selector valve 56, which can be either manually or electrically operated. In some embodiments, the selector valve 56 can be hydraulic or pneumatic. In a first position, the selector valve 56 can be used to route foamant from the foam tank 26 out a spigot 58 for priming of the FPS 2, for calibration of new additives, for drain-down of the foam tank 26, and/or for flushing of the FPS 2. The controller 10 can provide a simulated control mode for calibrating the FPS 2. The calibration of the FPS 2 can be based on parameters stored in the controller 10 to facilitate the calibration process. In some embodiments, signals from specific sensors (e.g., the flow meter 8) can be ignored for calibration purposes while the foam pump 22 can be fully operational. Over a certain time period, the pumped foamant can be collected in a measuring cup at the spigot 58 and can be compared to the desired flow rate. The user can adjust parameters (e.g., the speed of the foam pump 22) until a desired accuracy of the FPS 2 is achieved. In a second position, the selector valve 56 can route the foamant being pumped by the foam pump 22 through the conduit 50 and into the conduit 16.

In some embodiments, the selector valve 56 can be an electric calibration injection valve that can be used to automatically prime the FPS 2. When the foam pump 22 starts before the FPS 2 is primed, there will be some air in the lines. When the pistons of the foam pump 22 are pushing air, the torque profile of the motor rotor shaft (as discussed below) is different than when the foam pump 22 is pushing only foamant. In order to prime the FPS 2, the controller 10 can monitor the torque profile when the foam pump 22 is started and the controller 10 can automatically open the electric calibration injection valve in order to purge the air from the FPS 2. The electric calibration injection valve can be left open until the controller 10 determines that the torque profile has changed to indicate that the foam pump 22 is only pushing foamant and therefore the FPS 2 is primed. Once the FPS 2 is primed, the controller 10 can automatically close the electric calibration injection valve.

In some embodiments, rather than or in addition to the foam tank 26, one or more off-board foam sources can be coupled to the FPS 2 (e.g., for situations in which the foam tank 26 does not store a sufficient amount of foamant). The off-board foam sources can be any one or more of an off-board tote (e.g., typically a five gallon bucket of foamant), a second stationary foam tank, or a mobile trailer with a foam tank. An off-board foam source can be coupled to the FPS 2 with an off-board pick-up line that can be typically 10 to 20 feet long and can be filled with air before being primed. In order to prime the off-board pick-up line, the controller 10 can monitor the torque profile of the motor rotor shaft when the foam pump 22 is started. As long as the torque profile indicates that air is being pulled through the off-board pick-up line, the controller 10 can operate the foam pump 22 at a higher speed. Once the torque profile indicates only foamant is being pulled through the off-board pick-up line, the foam pump 22 can automatically slow down to a normal speed for foamant injection. Conversely, the controller 10 can also determine when the off-board foam source is running out of foamant. The controller 10 can indicate on the display 12 that the off-board foam source is running low. In some embodiments, the controller 10 can calculate how much longer (e.g., in minutes) the FPS 2 can be operated until the off-board foam source will run out of foamant. The display 12 can indicate that the foamant is low and the display 12 can indicate a remaining time period (e.g., a number of minutes) that the FPS 2 can continue to operate. The controller 10 can calculate the remaining time period by taking into account the current flow rate of the foamant through the foam pump 22. Once the controller 10 has determined that the off-board foam source is substantially empty, the controller 10 can automatically shut down the FPS 10.

Similarly, in some embodiments, the controller 10 can determine how much longer the FPS 2 can be operated until the foam tank 26 will run out of foamant. The level sensor 28 in the foam tank 26 can give a general indication that the foamant is running low. The display 12 can indicate that the foamant is low and the display 12 can also indicate a remaining time period (e.g., a number of minutes) that the FPS 2 can continue to operate. The controller 10 can calculate the remaining time period by taking into account the current flow rate of the foamant through the foam pump 22. Once the controller 10 has determined that the foam tank 26 is substantially empty, the controller 10 can automatically shut down the FPS 10.

In some embodiments, the fire-extinguishing system 1 can include a compressed air foam system (CAFS). A compressor of the CAFS can provide pressurized air to a nozzle of the discharge lines connected to the manifold 20. The compressed air can further enhance the effectiveness of the foamant.

Figure 2:
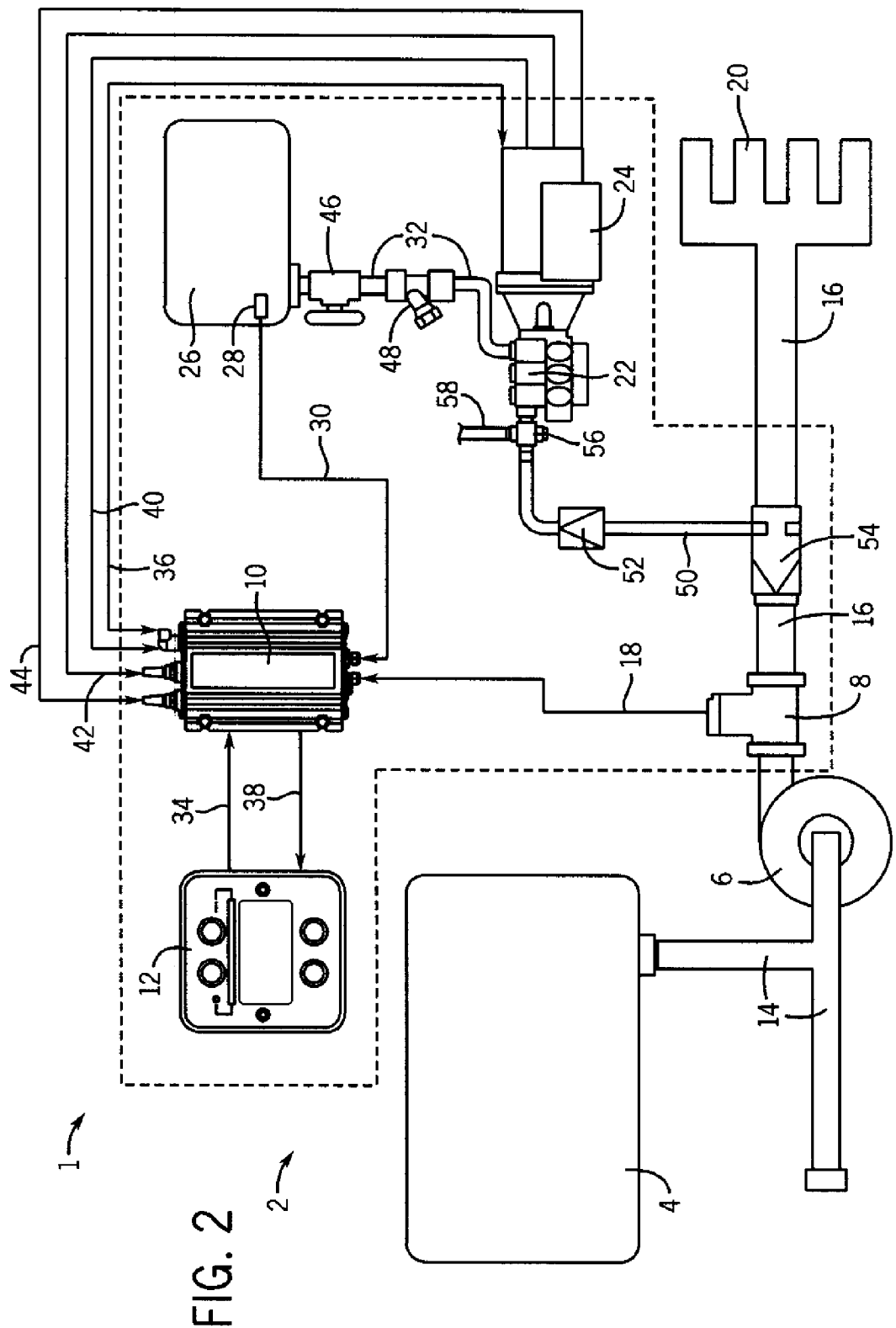
FIG. 2 is a schematic diagram of a fire-extinguishing system including the servo motor and having a foamant injection point downstream of a flow meter according to another embodiment of the invention.

FIG. 2 illustrates a fire-extinguishing system 1 according to another embodiment of the invention. While the flow meter 8 of FIG. 1 measures the total flow rate (i.e., the water flow rate plus any foamant), the flow meter 8 of FIG. 2 only measures the flow rate of the water. In some embodiments, multiple flow meters can be used to measure flow rates of the water through various points in the system 1.

Figure 3:
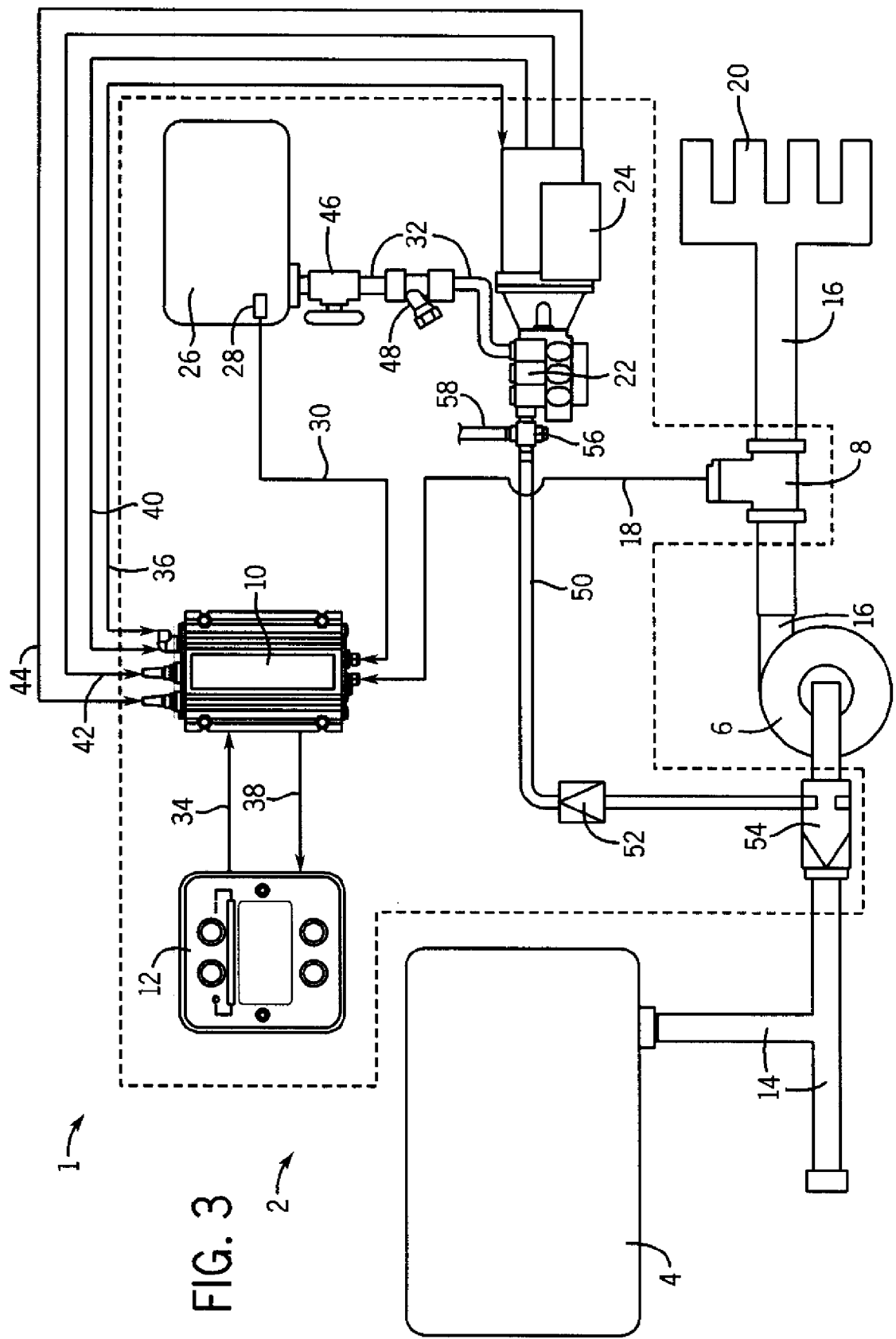
FIG. 3 is a schematic diagram of a fire-extinguishing system including the servo motor and having a foamant injection point upstream of a water pump according to yet another embodiment of the invention.

FIG. 3 illustrates a fire-extinguishing system 1 according to yet another embodiment of the invention in which the water pump 6 can pump a water-foamant solution. The outlet of the foam pump 22 can be connected to the conduit 14 upstream of the water pump 6. As a result, the flow meter 8 can measure the total flow rate. The foamant can be introduced into the stream of water at a lower pressure, because the stream of water in the conduit 14 is at a lower pressure than in the conduit 16.

Figure 4A:
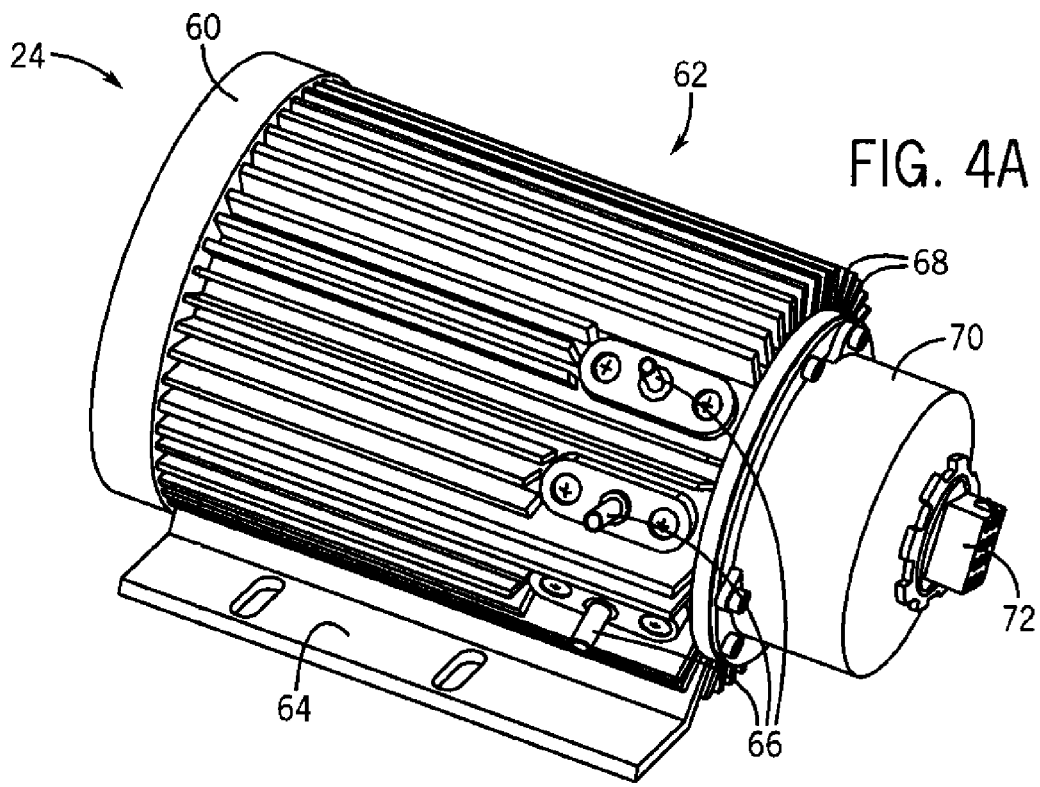
FIG. 4A is a perspective view of the servo motor according to one embodiment of the invention.

FIG. 4A illustrates a perspective view of the servo motor 24 according to one embodiment of the invention. The servo motor 24 can include a housing 60, a heat sink 62, a stand 64, and connectors 66. The heat sink 62 can include ribs 68, which can be positioned around a perimeter of the housing 60. The stand 64 can be used to securely mount the servo motor 24 in a suitable location. The connectors 66 can be used to supply power to the servo motor 24. In some embodiments, the controller 10 can be housed within the servo motor 24. In some embodiments, the controller 10 can include a digital signal processor (DSP) 70. In some embodiments, the DSP 70 can be coupled to the housing 60 of the servo motor 24. The DSP 70 can include a connector 72, which can enable the DSP 70 to connect to additional electronic equipment of the fire-extinguishing system 1. In some embodiments, the connector 72 can be used to supply power to the DSP 70.

Figure 4B:
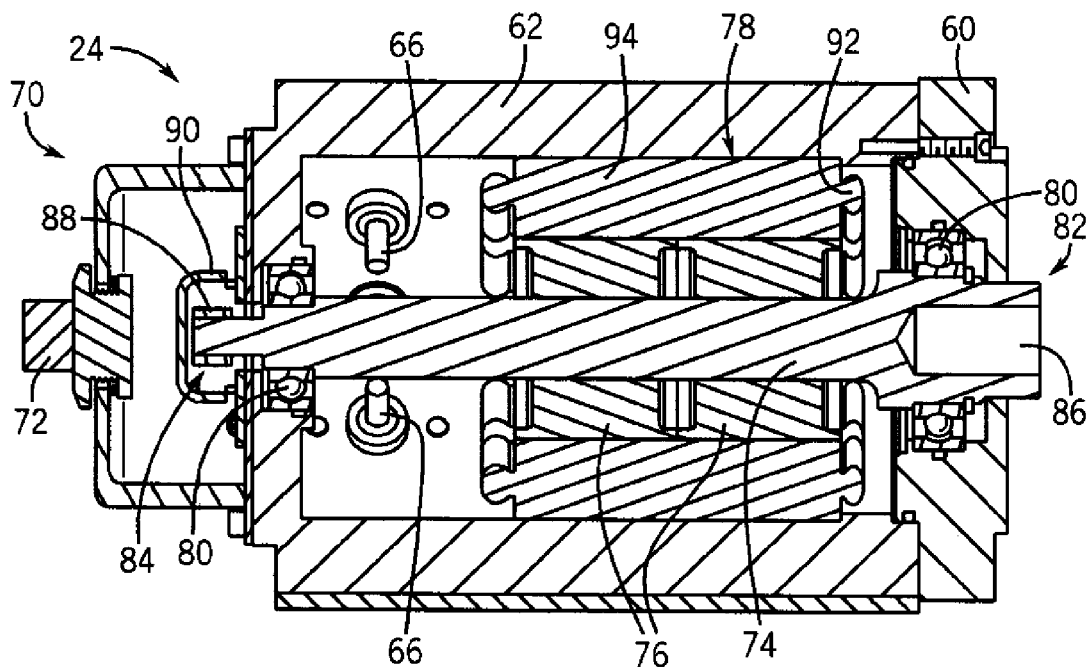
FIG. 4B is a cross-sectional view of the servo motor of FIG. 4A.

FIG. 4B illustrates a cross-sectional view of the servo motor 24 according to one embodiment of the invention. The servo motor 24 can include a rotor shaft 74, one or more rotors 76, and a stator 78. The rotor shaft 74 can be coupled to the housing 60 with one or more bearings 80 enabling the rotor shaft 74 to rotate with respect to the housing 60. The rotor shaft 74 can include a first end 82 and a second end 84. The first end 82 can include a coupling 86, which can enable the servo motor 24 to connect to the foam pump 22. The second end 84 can extend beyond the housing 60. In some embodiments, the second end 84 can extend into the DSP 70. The second end 84 can include projections 88. A sensor 90 can be positioned adjacent to the second end 84. The sensor 90 can include an encoder and/or a resolver. The sensor 90 can measure the position and/or speed of the rotor shaft 74, as disclosed in U.S. Pat. Nos. 6,084,376 and 6,525,502 issued to Piedl et al., the entire contents of which are herein incorporated by reference.

In some embodiments, the rotor 76 can be a permanent-magnet rotor. The rotor 76 can be positioned inside the stator 78. The stator 78 can include a stator core 92 and stator windings 94. In some embodiments, the rotor 76 can rotate to drive the rotor shaft 74, while the stator core 92 and the stator windings 94 can remain stationary. The connector 66 can extend into the housing 60 toward the rotor shaft 74. The connectors 66 can be coupled to the stator 78.

In some embodiments, the sensor 90 can be built into the motor housing 60 to accurately indicate the position and/or speed of the rotor shaft 74. In other embodiments, the sensor 90 can be included in the DSP 70. In some embodiments, the rotor shaft speed of the servo motor 24 can be substantially continually monitored via a feedback device, such as an encoder, resolver, hall effect sensors, etc. In other embodiments, the rotor shaft speed of the servo motor 24 can be measured without a physical sensor (e.g., by extracting information from a position of the rotor shaft 74).

The term "servo motor" generally refers to a motor having one or more of the following characteristics: a motor capable of operating at a large range of speeds without over-heating, a motor capable of operating at substantially zero speed and retaining enough torque to hold a load in position, and/or a motor capable of operating at very low speeds for long periods of time without over-heating. The term "torque" can be defined as the measured ability of the rotor shaft to overcome turning resistance. Servo motors can also be referred to as permanent-magnet synchronous motors, permanent-field synchronous motors, or brushless electronic commutated motors.

The servo motor 24 can be capable of precise torque control. The output torque of the servo motor 24 can be highly responsive and substantially independent of the rotor 76 position and the rotor shaft 74 speed across substantially the entire operating speed range. In some embodiments, the current draw of the servo motor 24 can be sent to the DSP 70 over the line 40 and can be used to compute the torque necessary to drive the servo motor 24.

The use of the servo motor 24 can simplify the actuation and control of the FPS 2, as opposed to a conventional DC electric motor having to rely on pulse width modulation (PWM) control for low flow/concentration rates (e.g., flow rates less than about 30 percent of a maximum output of the foam pump 22, or in one embodiment, about 0.01 GPM to about 5 GPM). As a result, the servo motor 24 can enable a smooth injection of the foamant into the water stream. In some embodiments, an operating pressure of the stream of water can be between about 80 PSI and about 800 PSI. In some embodiments, the use of the servo motor 24 can allow a smooth injection of the foamant even at low rotations per minute (RPM), which can result in an optimized mixing of the foamant into the water stream. Some embodiments of the invention improve the accuracy of the foamant/water mixture or ratio, which can improve the efficacy of the system and can provide a safer system for use by fire fighters.

In some embodiments including the CAFS, the servo motor 24 can eliminate or at least substantially reduce a so-called "slugging" or "slug-flow effect." First, conventional DC electric motors operated by pulse width modulation can result in pressure variations in the foam pump 22, which can be caused by the pulsing of the DC electric motors. Second, conventional DC electric motors operated by pulse width modulation can result in a poor mixing of the air with the foamant-water solution possibly forming air pockets inside the conduit 16 and/or the manifold 20. The formation of the air pockets can be exacerbated by an uneven injection of the foamant resulting from the pressure variations of the foam pump 22. The air pockets can induce a slugging of the discharge line connected to the manifold 20. The slugging can move the discharge line making it harder for an operator to control the discharge line. In some embodiments, the smooth injection of the foamant resulting from the use of the servo motor 24 can substantially reduce the poor mixing and/or the air pockets inside the conduit 16 and/or the manifold 20 thereby substantially weakening or even eliminating the "slug-flow effect."

The controller 10 can be external to the servo motor 24 or housed inside the servo motor 24. As shown in FIG. 5, the controller 10 can include the digital signal processor (DSP) 70, a micro-processor 100, and a memory 102. The memory 102 can include random access memory (RAM), read only memory (ROM), and/or electrically erasable programmable read only memory (EEPROM). In some embodiments, the controller 10 can include an analog/digital (A/D) converter and/or a digital/analog (D/A) converter in order to process different input signals and/or to interface with peripherals. In some embodiments, the DSP 70, the micro-processor 100, and the memory 102 can be included in a single device, while in other embodiments, the DSP 70, the micro-processor 100, and the memory 102 can be housed separately. In some embodiments, the DSP 70 and/or the memory 102 can be positioned inside or near the servo motor 24, while the micro-processor 100 and/or the memory 102 can be included with the display 12.

In some embodiments, the micro-processor 100 can provide an auto-start feature for the FPS 2, as disclosed in U.S. Pat. No. 7,318,482 issued to Arvidson et al., the entire contents of which is herein incorporated by reference. When selected by the user, the display 12 can transmit the auto-start user input to the micro-processor 100 via the line 34. With the auto-start feature selected, the foam pump 22 can be automatically activated, if the flow meter 8 indicates a positive flow rate and no error can be detected by the micro-processor 100. If the flow meter 8 indicates no flow (which can be referred to as "zero flow cut-off") or an error is detected, the controller 10 can stop the injection of foamant.

Figure 6:
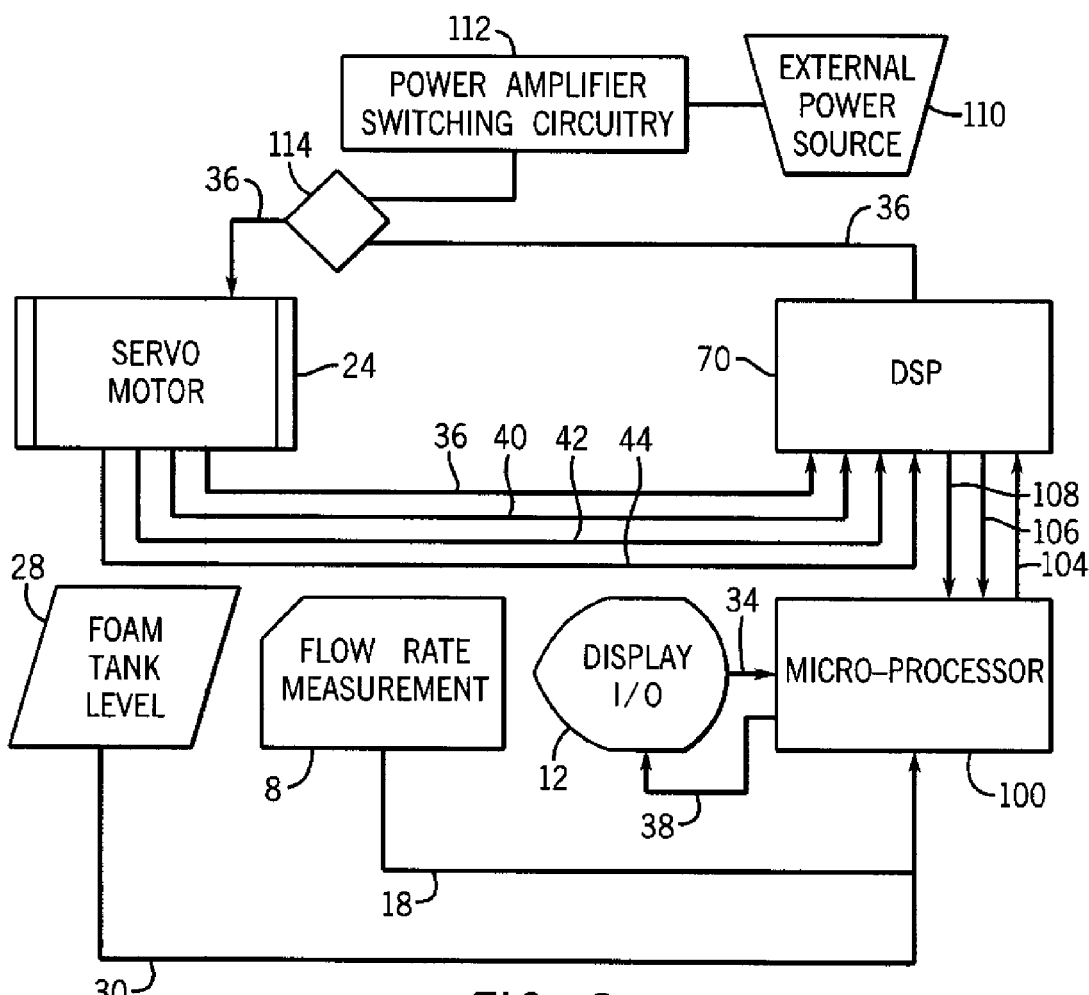
FIG. 6 is a schematic block diagram of electrical components for use with any one of the fire-extinguishing systems of FIGS. 1, 2, and 3 according to some embodiments of the invention.

FIG. 6 illustrates the connections between the electrical components and/or electronic equipment of the fire-extinguishing system 1 according to one embodiment of the invention. The measured flow rate of either total flow or water flow can be transmitted to the micro-processor 100 via the line 18. When a positive flow rate is detected, the micro-processor 100 can read a user input regarding the desired foamant concentration via the line 34. Based on the desired concentration, the micro-processor 100 can compute a base speed at which the servo motor 24 can operate the foam pump 22. In some embodiments, the micro-processor 100 can use the desired concentration and the flow rate signal from the line 18 to compute the base speed.

The DSP 70 can receive the base speed from the micro-processor 100 for the desired concentration of the water-foamant solution and the measured flow rate via a line 104. After initializing the addition of foamant (when the servo motor 24 is not running), the base speed can be transmitted directly to the servo motor 24 over the line 36. Once the servo motor 24 is running, the DSP 70 can process one or more of the following signals from the servo motor 24: the current draw of the servo motor 24, the speed of the rotor shaft 74, the angle of the rotor shaft 74, and temperature of the servo motor 24. Any suitable combination of these signals or additional signals can be used by the DSP 70 and/or the micro-processor 100 to modify the base speed to provide closed-loop control.

In some embodiments, the actual speed of the rotor shaft 74 of the servo motor 24 can be transmitted back to the DSP 70 via the line 36, which can transmit the signals to the micro-processor 100 via the line 104, if the foam tank level sensor 28 does not indicate a low foamant level and no other error can be detected within the fire-extinguishing system 1. If a low foamant level signal is sent to the micro-processor 100 via the line 30 or an error is communicated by the DSP 70 to the micro-processor 100 via a line 106, the micro-processor 100 can send a command to the DSP 70 to stop the servo motor 24.

In some embodiments, the calculated torque of the rotor shaft 74 can be transmitted to the micro-processor 100 via a line 108. With the actual speed of the rotor shaft 74 and the calculated torque of the rotor shaft 74, the micro-processor 100 can compute the flow rate of the foamant. The newly-computed flow rate can be compared to the previous flow rate required to provide the desired concentration, and a new base speed can be computed by the micro-processor 100.

In some embodiments, the rapid compute time of the controller 10 can allow for several evaluations of foamants and modifications of base speed per pump cycle. This can result in rapid adjustments to varying parameters (e.g., the water flow rate), while helping to provide a substantially uninterrupted and smooth flow of the water-foamant solution at precise concentrations. In some embodiments, the controller 10 can determine the viscous properties of foamant that is being pumped by the foam pump 22. In some embodiments, the controller 10 can automatically compensate for different foamants having different viscosities or for a single type of foamant having a different viscosity depending on the current operating temperature of the FPS 2. The controller 10 can take into account the change in viscosity feedback so that the water-foamant solution can continue to be provided with a precise concentration. In some embodiments, more than one foam tank 26 can be coupled to the FPS 2. The controller 10 can automatically determine that different types of foamant are stored in the different foam tanks 26. The controller 10 can automatically operate the foam pump 22 to achieve precise concentrations in the water-foamant solution for each particular type of foamant.

As shown in FIG. 6, the servo motor 24 can be powered by an external power source 110. The rotor shaft 74 speed signal can be sent from the DSP 70 via the line 36 to a power amplifier 112, which can be connected to the external power source 110. Depending on the rotor shaft 74 speed signal received from the DSP 70, the power amplifier 112 can provide the appropriate power (e.g., the appropriate current draw) to the servo motor 24. In some embodiments, the power amplifier 112 can supply the servo motor 24, the controller 10, and additional electrical components and/or electronic equipment with power.

In some embodiments, the fire-extinguishing system 1 can include a load dump protection circuit 114. In some embodiments, the load dump protection circuit 114 can be part of the power amplifier 112. The load dump protection circuit 114 can prevent an over-voltage peak from causing damage to the controller 10, the servo motor 24, and other electrical components and/or electronic equipment. In some embodiments, the load dump protection circuit 114 can protect the electrical components and/or electronic equipment of the fire-extinguishing system 1 from an under-voltage condition and/or a wrong polarity of the external power source 110. In some embodiments, the load dump protection circuit 114 can disconnect the electrical components and/or electronic equipment of the fire-extinguishing system 1, if the voltage of the external power source 110 is negative, below a minimum, or above a specified level.

Figure 7:
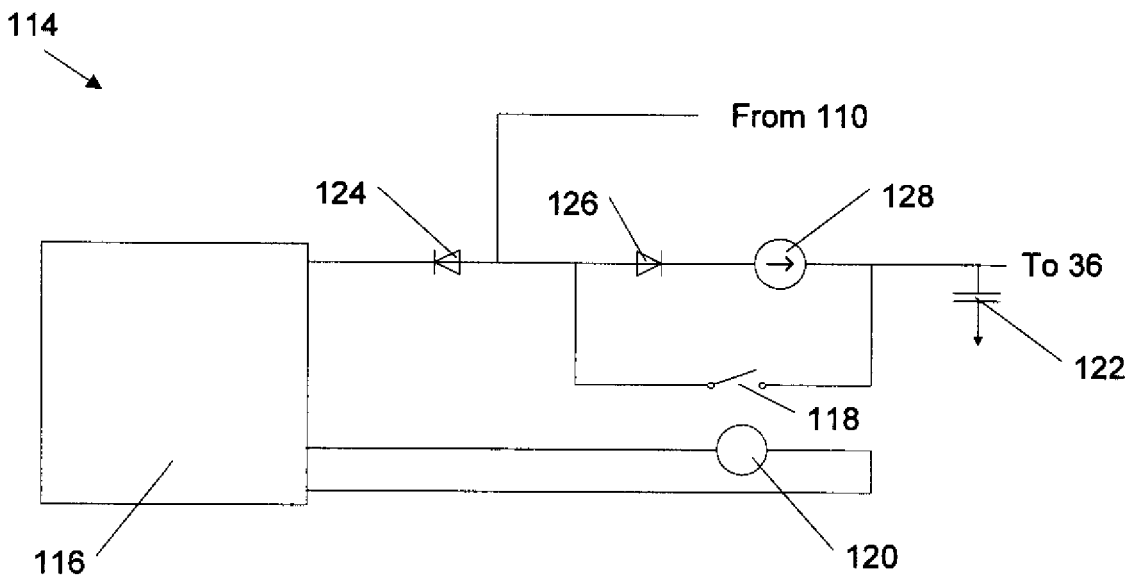
FIG. 7 is a schematic block diagram of a load dump protection system according to one embodiment of the invention.

FIG. 7 illustrates the load dump protection circuit 114 according to one embodiment of the invention. The load dump protection 114 can include a sensing circuit 116, a relay contact 118, a relay coil 120, a capacitor 122, a first diode 124, a second diode 126, and a current source 128. The relay coil 120 can be connected to the sensing circuit 116. The relay coil 120 can energize and de-energize the relay contact 118. Before the relay contact 118 closes, the current source 128 can charge the capacitor 122 with a limited current to enable a "soft start." Once the capacitor 122 is charged to the correct level, the current source 128 and the second diode 126 can be bypassed by the relay contact 118 enabling the high currents of normal operation to flow.

The first diode 124 and the second diode 126 can prevent damage to the sensing circuit 116 and/or other electronic equipment of the fire-extinguishing equipment 1, if the voltage supplied from the external power supply 110 has the wrong polarity. For example, if the external power supply 110 is a battery, which is being disconnected for maintenance and/or repair procedures, the first diode 124 and the second diode 126 can prevent damage to the electronic equipment of the fire-extinguishing system 1, if the battery is re-connected incorrectly.

In some embodiments, the sensing circuit 116 can withstand an over-voltage peak. The sensing circuit 116 can also rapidly detect the over-voltage peak or an under-voltage condition. The sensing circuit 116 can detect the over-voltage peak or the under-voltage condition substantially independent of a power status of the servo motor 24 and/or the controller 10. In some embodiments, the sensing circuit 116 can detect the over-voltage peak or the under-voltage condition even if the servo motor 24 and/or the controller 10 are not running. The sensing circuit 116 can de-energize the relay contact 118 through the relay coil 120. As a result, all of the internal power supplies of the fire-extinguishing system 1 can be switched off almost immediately. In some embodiments, the current source 128 can charge the capacitor 122 with the limited current before the relay contact 118 is re-energized again. The sensing circuit 116 can re-energize the relay contact 118 and can re-connect all internal power supplies once no over-voltage conditions, such as over-voltage peaks, or under-voltage conditions are being detected. In some embodiments, the relay contact 118 can be re-energized once no over-voltage conditions or under-voltage conditions are being detected and the capacitor 122 is charged to the correct level. Once the relay contact 118 is re-energized, the second diode 126 and the current source 128 can be bypassed by the relay contact 118 to enable the supply of normal operating currents. For example, if the fire-extinguishing system 1 includes a fire truck, welding being performed on the fire truck for repairs, maintenance, or equipment installation can result in over-voltage peaks traveling through the fire truck. The load dump protection circuit 114 can help prevent damage to the electronic equipment of the fire-extinguishing system 1 possibly caused by the over-voltage peaks.

Figure 8:
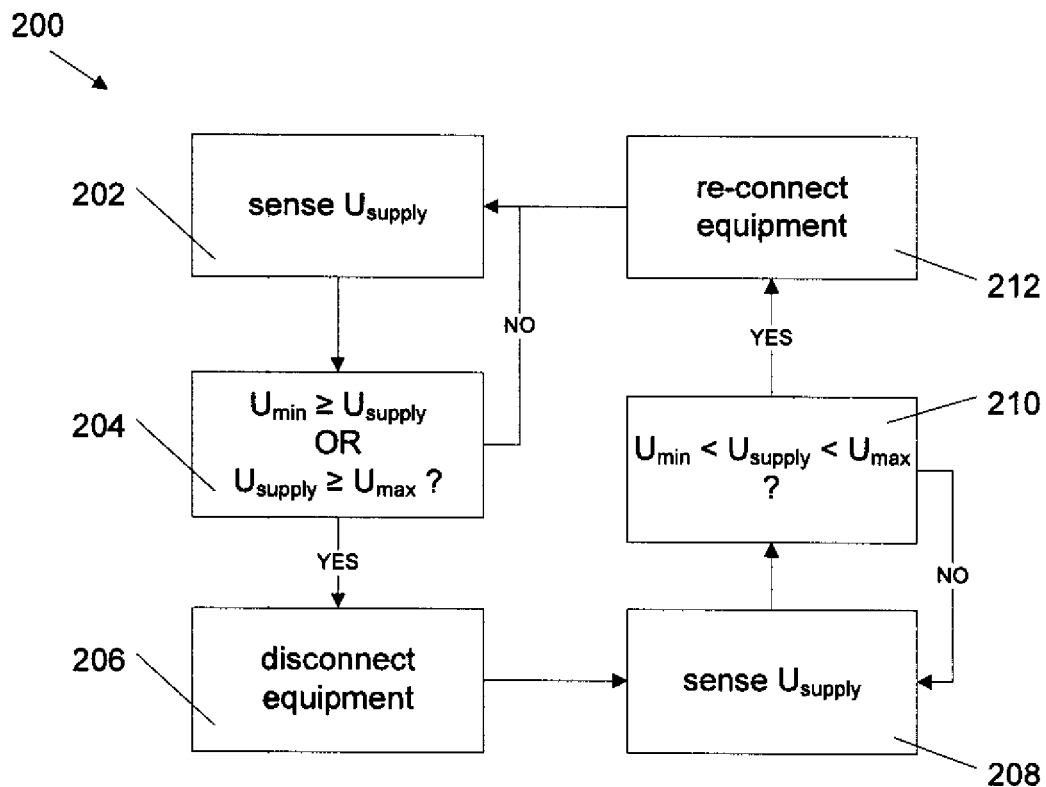
FIG. 8 is flowchart of a load dump protection method according to one embodiment of the invention.

FIG. 8 is a flow chart describing a load dump protection method 200 according to one embodiment of the invention. In some embodiments, the sensing circuit 116 can sense (at step 202) a voltage $U_{supply}$. If the voltage $U_{supply}$ is less than a maximum threshold $U_{max}$ but higher than a minimum threshold $U_{min}$ (at step 204), the sensing circuit 116 can sense (at step 202) the voltage $U_{supply}$ again. If the voltage $U_{supply}$ is higher than the maximum threshold $U_{max}$ or below the minimum threshold $U_{min}$ (at step 204), the sensing circuit 116 can disconnect (at step 206) the electronic equipment of the fire-extinguishing system 1 including the controller 10, the servo motor 24, and/or other electronics substantially before the over-voltage condition or the under-voltage condition can cause damage to the electronic equipment of the fire-extinguishing system 1. In some embodiments, the sensing circuit 116 can disengage the relay contact 118 to disconnect the electronic equipment of the fire-extinguishing system 1. Once disconnected, the sensing circuit 116 can continue to sense (at step 208) the voltage $U_{supply}$ until the voltage $U_{supply}$ has dropped below the maximum threshold $U_{max}$ or has risen above the minimum threshold $U_{min}$ (at step 210). The sensing circuit 116 can re-connect (at step 212) the electronic equipment before the load dump protection method 200 is restarted (at step 202). In some embodiments, the relay contact 118 can be re-energized in order to re-connect the electronic equipment of the fire-extinguishing system 1.

In some embodiments, the controller 10 can provide drive diagnostics for the FPS 2, which can be downloaded for further processing. A technician can use the drive diagnostics to analyze any errors of the FPS 2. The drive diagnostics can include error messages specifically for the servo motor 24. In some embodiments, the controller 10 can be capable of detecting an interrupted connection between components of the FPS 2 and can send an error signal to the controller 10. In one embodiment, the following types of errors can be communicated to the DSP 70 and/or the micro-processor 100: one or more components of the servo motor 24 exceed threshold temperatures, the servo motor 24 requires a higher current for the operation than a threshold current (which can be referred to as "current fold back"), and the servo motor 24 is experiencing a stall condition.

Figure 9:
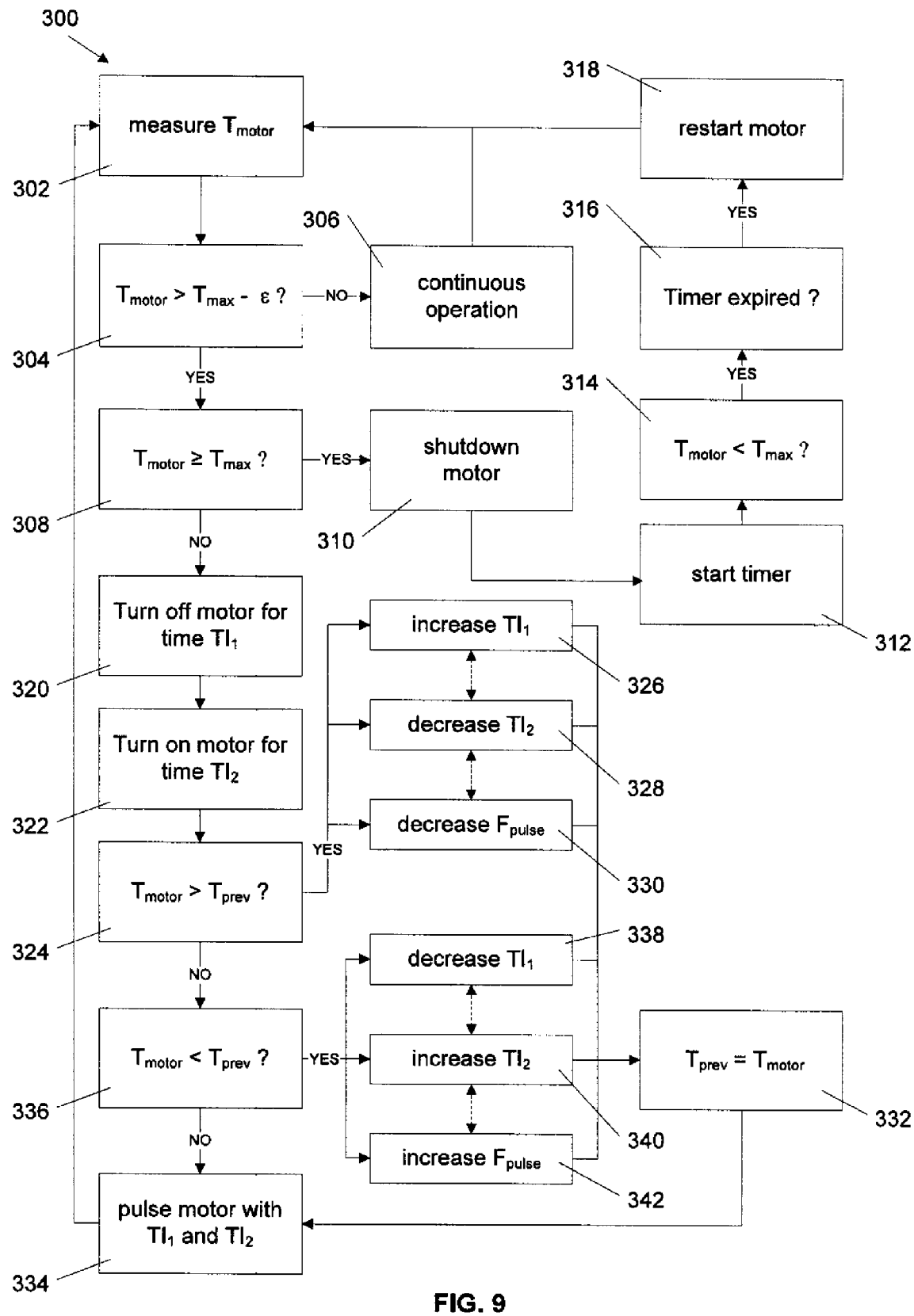
FIG. 9 is a flowchart of a power management control of the servo motor according to one embodiment of the invention.

In some embodiments, the servo motor 24 can generate heat, especially at high RPM, (i.e., for high concentration rates of the water-foamant solution and/or high flow rates of the water stream). The servo motor 24 can include passive heat controls, such as heat sinks, vent holes, etc. In some embodiments, as shown in FIG. 9, the servo motor 24 can use a power management control method 300 to actively prevent over-heating. In some embodiments, the duty cycle of the current supplied to the servo motor 24 can be altered to prevent over-heating.

FIG. 9 illustrates the power management control method 300 according to one embodiment of the invention. In some embodiments, the DSP 70 can measure (at step 302) a temperature $T_{motor}$ of the servo motor 24. The DSP 70 can measure the temperature of any component of the servo motor 24. In some embodiments, the DSP 70 can measure the temperature of multiple components. The DSP 70 can determine (at step 304) if the temperature $T_{motor}$ is approaching a maximum temperature $T_{max}$ (i.e., if the temperature $T_{motor}$ is within a range $\epsilon$). The maximum temperature $T_{max}$ can be stored in the memory 102, and if multiple components of the servo motor 24 are monitored by the DSP 70, the maximum temperature $T_{max}$ can be component specific. If the maximum temperature $T_{max}$ does not approach the temperature $T_{motor}$, the controller 10 can operate the servo motor 24 with the computed speed to fulfill the foamant flow rate and/or injection pressure at 306. The DSP 70 can restart (at step 302) the power management control method 300 by measuring the temperature $T_{motor}$.

If the temperature $T_{motor}$ approaches the maximum temperature $T_{max}$, the DSP 70 can determine (step 308) whether the maximum temperature $T_{max}$ has been exceeded. If the maximum temperature $T_{max}$ has been exceeded, the servo motor 24 can be shut down (at step 310) and the DSP 70 can start a timer (at step 312). The timer can be set for a time period long enough to allow the servo motor 24 to cool. In some embodiments, the timer can be set for a time period of about one minute. After the timer has been started (at step 312), the DSP 70 can continue to monitor (at step 314) the temperature $T_{motor}$ of the servo motor 24. If the temperature $T_{motor}$ has dropped below the maximum temperature $T_{max}$, the DSP 70 can determine whether the timer has expired (at step 316). Once the timer has expired (at step 314), the DSP 70 can restart (at step 318) the servo motor 24 and can measure (at step 302) the temperature $T_{motor}$ again.

If the temperature $T_{motor}$ is below the maximum temperature $T_{max}$ but within the range $\epsilon$, the DSP 70 can shut down (at step 320) the servo motor 24 for a first time interval $TI_1$. The DSP 70 can turn on (at step 322) the servo motor 24 for a second time interval $TI_2$. In some embodiments, the first time interval $TI_1$ and/or the second time interval $TI_2$ can be a default value and/or a previously stored value in the controller 10. In some embodiments, the servo motor 24 can run continuously during the second time interval $TI_2$, while in other embodiments, the servo motor 24 can be pulsed with a certain frequency $F_{pulse}$. The temperature $T_{motor}$ can be compared (at step 324) to a previously-stored temperature $T_{prev}$. In some embodiments, the temperature $T_{prev}$ can be a default value during initialization (i.e., if no temperature has been previously stored in the memory 102 since the last power-up of the servo motor 24). If the temperature $T_{prev}$ is lower than the temperature $T_{motor}$, the DSP 70 can increase (at step 326) the first time interval $TI_1$, decrease (at step 328) the second time interval $TI_2$, and/or decrease (at step 330) the frequency $F_{pulse}$. The DSP 70 can store (at step 332) the temperature $T_{motor}$ as the temperature $T_{prev}$, in the memory 102. The DSP 70 can operate (at step 334) the servo motor 24 with the first time interval $TI_1$ and the second time interval $TI_2$ resulting in a pulsing of the servo motor 24. In some embodiments, the pulse frequency resulting from the first time interval $TI_1$ and the second time interval $TI_2$ can be substantially lower than the frequency $F_{pulse}$, at which the servo motor 24 can be operated during the second time interval $TI_2$. In some embodiments, the frequency $F_{pulse}$ can be less than about 20 kilohertz.

If the temperature $T_{motor}$ is not higher than the temperature $T_{prev}$ (at step 324), the DSP 70 can determine (at step 336) whether the temperature $T_{prev}$ is higher than the temperature $T_{motor}$. If the temperature $T_{prev}$ is higher than the temperature $T_{motor}$, the DSP 70 can decrease (at step 338) the first time interval $TI_1$, increase (at step 340) the second time interval $TI_2$, and/or increase (at step 342) the frequency $F_{pulse}$. The DSP 70 can store (at step 332) the temperature $T_{motor}$ as the temperature $T_{prev}$ in the memory 102. The DSP 70 can pulse (at step 334) the servo motor 24 with the first time interval $TI_1$ and the second time interval $TI_2$. If the temperature $T_{prev}$ is substantially equal to the temperature $T_{motor}$, the servo motor 24 can be pulsed (t step 334) with the first time interval $TI_1$ and the second time interval $TI_2$. After step 334, the DSP 70 can restart (at step 302) the power management control 300.

In some embodiments, the power management control method 300 can be self-adapting and can learn the optimal values for at least one of the first time interval $TI_1$, the second time interval $TI_2$, and the frequency $F_{pulse}$. As a result, the servo motor 24 can operate at high RPM over prolonged periods of time before having to shut down due to an over-temperature condition. In some embodiments, the power management control method 300 can adjust at least one of the first time interval $TI_1$, the second time interval $TI_2$, and the frequency $F_{pulse}$ over a short period of time while enabling the FPS 2 to deliver the maximum foamant flow rate without exceeding the maximum temperature $T_{max}$. In some embodiments, the period of time in which the power management control method 300 learns the optimal values for pulsing the servo motor 24 can be within about 10 rotations of the rotor shaft 74.

In some embodiments, the operation of the servo motor 24 with the frequency $F_{pulse}$ can result in power losses in the servo motor 24 itself, the controller 10, and/or the power amplifier 112. The power losses can increase the temperature of the respective component and/or equipment. In some embodiments, the frequency $F_{pulse}$, can be used to determine a physical location of the power losses. In some embodiments, the frequency $F_{pulse}$ can be increased to reduce the power losses in the servo motor 24 in order to assist with the power management control method 300 in preventing the servo motor 24 from overheating. As a result, the increase frequency $F_{pulse}$ can increase the power losses in the controller 10 and/or the power amplifier 112. To prevent overheating of the controller 10 and/or the power amplifier 112, the frequency $F_{pulse}$ can be decreased in order to limit the power losses. As a result, the decreased frequency $F_{pulse}$ can be used to increase the power losses in the servo motor 24.

In some embodiments, the power management control method 300 can be used to adjust the frequency $F_{pulse}$ to balance the power losses. In some embodiments, the power management control method 300 can vary the frequency $F_{pulse}$ in order to prevent overheating of the servo motor 24 and/or any other electronic equipment of the fire-extinguishing system 1. In some embodiments, the power management control method 300 can determine a certain frequency $F_{pulse}$ depending on an operation point and/or condition of the servo motor 24. In some embodiments, varying the frequency $F_{pulse}$ can maximize the overall system efficiency of the FPS 2.

Figure 10A:
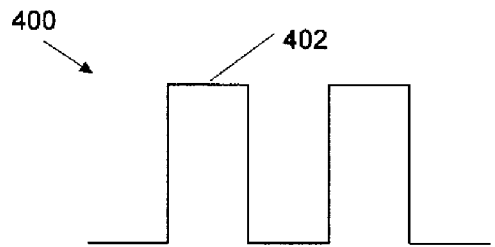
FIGS. 10A through 10D are schematic graphs of various pulse shapes according to some embodiments of the invention.
Figure 10B:
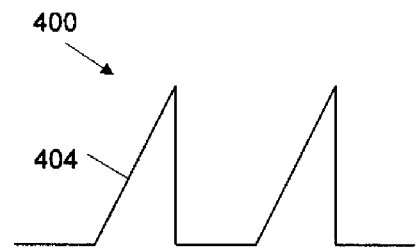
Figure 10C:
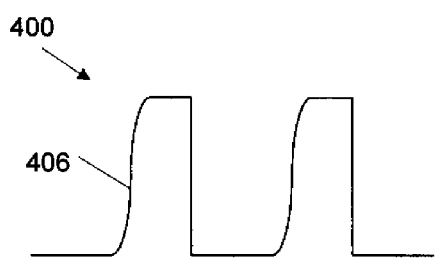
Figure 10D:
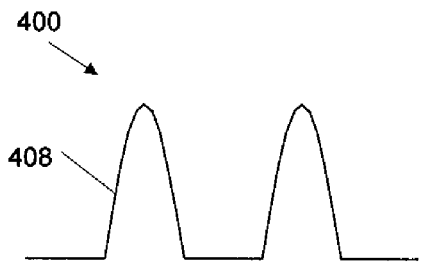

FIGS. 10A through 10D illustrate various tailored pulse shapes 400 according to some embodiments of the invention. The tailored pulse shapes 400 can include a step pulse shape 402 (FIG. 10A), a linear ramp pulse shape 404 (FIG. 10B), a polynomial pulse shape 406 (FIG. 10C), and a trigonometric pulse shape 408 (FIG. 10D). In some embodiments, a beginning and/or an end of a pulse can be tailored in order to derive the tailored pulse shapes 400. The polynomial pulse shape 406 can be approximated by any suitable higher polynomial and/or rational function. The trigonometric pulse shape 408 can be approximated by any trigonometric function including sine, cosine, tangent, hyperbolic, arc, and other exponential functions including real and/or imaginary arguments.

In some embodiments, the power management control method 300 can use the tailored pulse shapes 400. The tailored pulse shapes 400 can be adjusted to minimize the mechanical wear of the servo motor 24. In some embodiments, the tailored pulse shapes 400 can minimize mechanical stresses being transferred from the servo motor 24 onto the FPS 2 and/or additional components of the fire-extinguishing system 1. For example, the tailored pulse shapes 400 can minimize a mechanical stress on the foam pump 22 and connecting conduits. The tailored pulse shapes 400 can be adjusted to optimize the amount of work output for the amount of power supplied to the servo motor 24. In some embodiments, the tailored pulse shapes 400 can be modified to lower a thermal shock of the servo motor 24. Heat generated by the servo motor 24 at a high RPM (e.g., high foamant flow rates and/or high water flow rates) can be reduced so that the servo motor 24 can continue to operate at the high RPM over prolonged periods of time without shutting down due to an over-temperature condition and/or changing the first time interval $TI_1$, the second time interval $TI_2$, and/or the frequency $F_{pulse}$.

Figure 11:
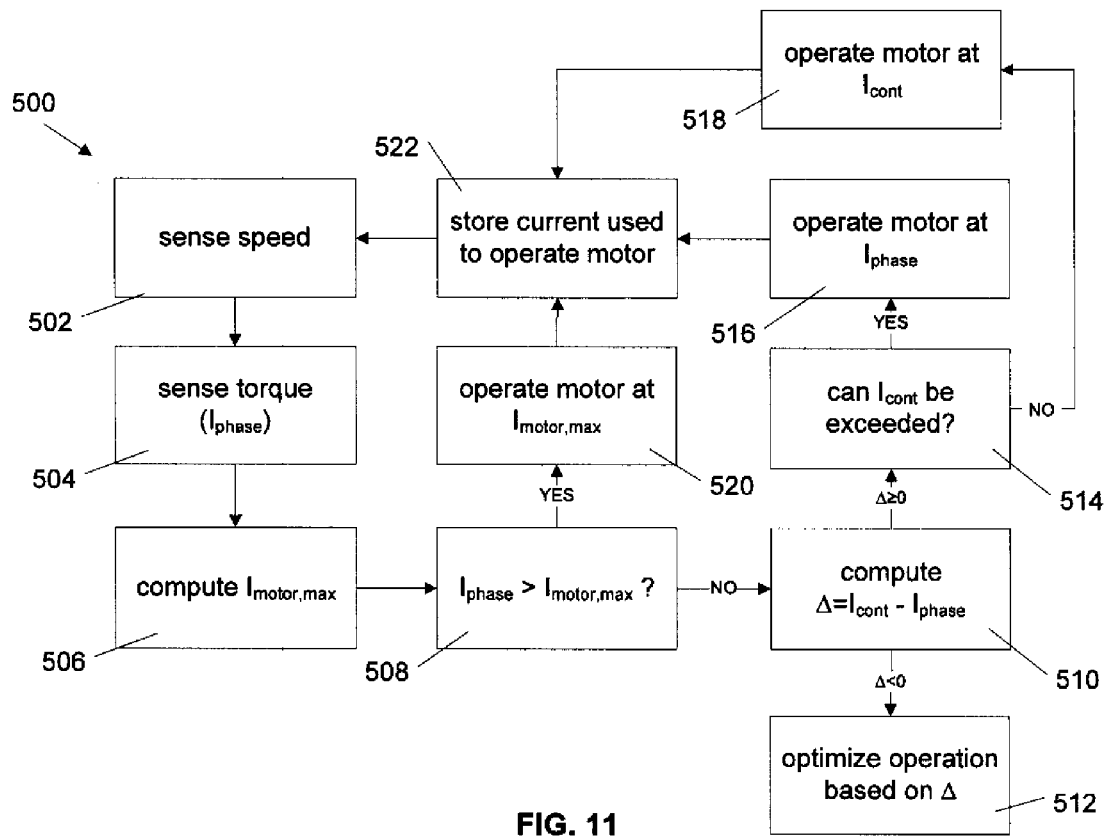
FIG. 11 is a flowchart of a current fold back protection method according to one embodiment of the invention.

FIG. 11 is a flow chart describing a current fold back protection method 500 according to some embodiments. The current fold back protection method 500 can prevent the servo motor 24 from drawing a high current that would damage the servo motor 24. The current fold back protection method 500 can optimize the operation of the servo motor 24. In some embodiments, the current fold back protection method 500 can maximize an output of the FPS 2. The current fold back protection method 500 can be performed by the controller 10. In some embodiments, the DSP 70 can perform the current fold back protection method 500. The controller 10 can sense (at step 502) the rotor shaft speed. The controller 10 can sense (at step 504) the rotor shaft torque and/or an actual phase current $I_{phase}$ supplied to the servo motor 24. In some embodiments, the controller 10 can compute the rotor shaft 74 torque with the phase current $I_{phase}$. The controller 10 can compute (at step 506) a maximum motor phase current $I_{motor,max}$, which can be the highest allowable current being supplied without damaging the servo motor 24 and/or the controller 10. In some embodiments, the maximum motor phase current $I_{motor,max}$ can vary with the speed of the rotor shaft 74. In some embodiments, the controller 10 can multiply the speed of the rotor shaft 74, the torque of the rotor shaft 74, and an efficiency parameter of the servo motor 24 in order to compute the maximum motor phase current $I_{motor,max}$.

If the phase current $I_{phase}$ is less than the maximum motor phase current $I_{motor,max}$ (at step 508), the controller 10 can compute (at step 510) a difference $\Delta$ between a continuous current limit $I_{cont}$ and the phase current $I_{phase}$. The continuous current limit $I_{cont}$ can be the maximum current at which the servo motor 24 can substantially continuously run without resulting in an over-temperature of the servo motor 24 and/or the controller 10. In some embodiments, the continuous current limit $I_{cont}$ can be based on an overall thermal capacity of the fire-extinguishing system 1. The continuous current limit $I_{cont}$ can be stored in the memory 102.

If the continuous current limit $I_{cont}$ is larger than the phase current $I_{phase}$, the difference $\Delta$ is positive and can be used to optimize (at step 512) the operation of the servo motor 24, for example to increase an injection pressure of the FPS 2. If the difference $\Delta$ is negative, the controller 10 can determine (at step 514) whether the continuous current limit $I_{cont}$ can be exceeded. To determine whether the continuous current limit $I_{cont}$ can be exceeded, the controller 10 can evaluate a history of supplied currents to operate the servo motor 24 and/or the difference Δ. In some embodiments, the history of supplied currents to operate the servo motor 24 can include computing a root mean square (RMS) value of the supplied current and/or squaring the supplied current and multiplying the time.

If the continuous current limit $I_{cont}$ can be exceeded, the controller 10 can operate (at step 516) the servo motor 24 with the phase current $I_{phase}$. If the continuous current limit $I_{cont}$ may not be exceeded, the controller 10 can operate (at step 518) the servo motor 24 with the continuous current limit $I_{motor,max}$. If the phase current $I_{phase}$ is larger than the maximum motor phase current $I_{motor,max}$ (at step 508), the servo motor 24 can be operated with the maximum motor phase current $I_{motor,max}$ (at step 520). At step 522, the controller 10 can store either one of the phase current $I_{phase}$, the continuous current limit $I_{cont}$, and the maximum motor phase current $I_{motor,max}$, which has been supplied to the servo motor 24, in the memory 102. The controller 10 can then restart the current fold back protection method 500 by sensing (at step 502) the speed of the rotor shaft 74.

If the phase current $I_{phase}$ is limited to the maximum motor phase current $I_{motor,max}$ or the continuous current limit $I_{cont}$, the servo motor 24 can be operated with the maximum motor phase current $I_{motor,max}$ (at step 520) or the continuous current limit $I_{cont}$ (at step 518). Operating the servo motor 24 at the maximum motor phase current $I_{motor,max}$ or the continuous current limit $I_{cont}$ can prevent damage to the servo motor 24. Due to the maximum motor phase current $I_{motor,max}$ and/or the continuous current limit $I_{cont}$ being lower than the current draw necessary to operate the servo motor 24, operating the servo motor 24 at the maximum motor phase current $I_{motor,max}$ or the continuous current limit $I_{cont}$ can result in a stall of the servo motor 24. The controller 10 can detect the stall of the servo motor 24. In one embodiment, the angle of the rotor shaft 74 of the servo motor 24 can be used to identify a stall condition of the servo motor 24. Other embodiments of the invention can use the speed of the rotor shaft 74 of the servo motor 24 to detect a stall condition of the servo motor 24. Once a stall condition has been detected, the servo motor 24 can attempt to operate again after a certain time interval. In some embodiments, the time interval can be about one second so that the servo motor 24 can drive the foam pump 22 again substantially immediately after the stall condition has been removed.

A power stage rating of the servo motor 24 and/or the controller 10 can be determined by a continuous operating current and a peak operating current. The continuous operating current can influence the heat generated by the servo motor 24 and/or the controller 10. The peak operating current can determine the power rating of the servo motor 24 and/or the controller 10. In some embodiments, the servo motor 24 can be designed to achieve a specific torque constant. Multiple parameters can influence the torque constant. In some embodiments, the torque constant can depend on the number of windings 94, the number of poles of the rotor 76, the pattern of the windings 94, the thickness of the wire used for the windings 94, the material of the wire, the material of the stator 78, and numerous other parameters. In some embodiments, the temperature of the servo motor 24 can influence the torque constant. As a result, the torque constant can vary because the temperature of the servo motor 24 can change significantly over the course of a fire-fighting operation. In some embodiments, the DSP 70 can include a mapping procedure to compensate for the temperature variation and the resulting change in the torque constant. As a result, the torque of the rotor shaft 74 that is necessary to drive the servo motor 24 can be accurately computed over a large range of temperatures.

The torque constant can be stored in the memory 102. In some embodiments, the torque constant can be accessed by the DSP 70. In some embodiments, the DSP 70 can compute the torque of the rotor shaft 74 that is necessary to drive the servo motor 24 based on the torque constant and the current draw of the servo motor 24. The torque constant can influence the peak operating current. In some embodiments, a large torque constant can result in a low power stage rating of the servo motor 24. In some embodiments, the high torque constant can reduce the peak operating current. In some embodiments, the peak operating current can be reduced from about 110 Amperes to about 90 Amperes. In some embodiments, the heat generation during peak operation of the servo motor 24 can be reduced by increasing the torque constant. In some embodiments, the large torque constant can lengthen a time period during which the servo motor 24 can operate at peak operating current without overheating.

In some embodiments, the servo motor 24 can be driven with high torque values down to substantially zero RPM. As a result, the FPS 2 can introduce the foamant into the water stream of the fire-extinguishing system 1 with superior accuracy and/or substantially superior mixing efficiency. The high torque values can be achieved by an increased back electromotive force (BEMF) constant of the servo motor 24. In some embodiments, the BEMF constant can be proportional to the torque constant. The increased BEMF constant can reduce the current necessary to drive the servo motor 24. As a result, the servo motor 24 can achieve a certain torque of the rotor shaft 74 at the reduced current. The increased BEMF constant can reduce power losses in the controller 10 and/or other electronic equipment of the fire-extinguishing system 1. In some embodiments, the BEMF constant can be related to the highest viscosity of the foamant to be intended to be used in the fire-extinguishing system 1. In some embodiments, the BEMF constant can be at least 3.5 volts root mean square per thousand RPM (VRMS/KPRM) for a DC bus voltage of about 12 volts. In some embodiments, the BEMF constant can be at least about 46 VRMS/KPRM for a DC bus voltage of about 160 volts. In some embodiments, the ratio of the BEMF constant to a voltage driving the servo motor 24 can be constant.

In some embodiments, the high BEMF constant can reduce the maximum speed of the rotor shaft 74 at which the servo motor 24 can be driven. In some embodiments, the BEMF constant and the maximum speed of the rotor shaft 74 of the servo motor 24 can be directly proportional. For example, if the BEMF constant is doubled, the maximum speed of the rotor shaft 74 of the servo motor 24 can be halved. In some embodiments, the BEMF constant can be a compromise between a low speed requirement, a high speed requirement, and a thermal load requirement of the servo motor 24. In some embodiments, the low speed requirement of the servo motor 24 can dictate a certain BEMF constant, which can result in the servo motor 24 not being able to fulfill the high-speed requirement in order to fulfill a specific foamant flow rate and/or injection pressure of the FPS 2.

In some embodiments, the servo motor 24 can use a phase angle advancing technique for the supplied power in order to increase the maximum speed of the rotor shaft 74. In some embodiments, a phase angle can be advanced by supplying a phase current at an angle increment before the rotor 76 passes a BEMF zero crossing firing angle. In some embodiments, the phase angle advancing technique can retard the phase angle by supplying the phase current at the angle increment after the rotor 76 has passed the BEMF zero crossing firing angle. In some embodiments, the phase angle advancing technique can influence the BEMF constant. In some embodiments, advancing the phase angle can decrease the BEMF constant.

In some embodiments, the servo motor 24 can be optimized to a certain injection pressure and/or desired foamant flow rate range for the fire-extinguishing system 1. In one embodiment, the servo motor 24 can drive the foam pump 22 without the phase angle advancing technique to result in a foamant flow rate of about 2 to about 4 gallons per minute (GPM) and an injection pressure of about 400 pounds per square inch (PSI). In this embodiment, the phase angle advancing technique can increase the foamant flow rate to about 5 GPM, which can be delivered at the injection pressure of about 150 PSI. In some embodiments, the increment of the phase angle advancing technique can be related to the speed of the rotor shaft 74. In one embodiment, the increment can be about +/−45 electrical degrees.

In some embodiments, the torque necessary to drive the servo motor 24 can be an indication of the viscosity of the foamant. As a result, the flow rate of the foamant can be precisely calculated. The micro-processor 100 can also use the torque of the rotor shaft 74 that is calculated by the DSP 70 to identify the foamant being added to the water stream. The calculated torque of the rotor shaft 74 can be compared with calibration values stored in the memory 102 of the controller 10. The auto-calibration feature of the FPS 2 can allow foamants to be interchanged without repeating the calibration that is usually necessary to obtain accurate flow rates.

In some embodiments, the servo motor 24 can be operated with a direct current (DC) power supply (e.g., a battery of a fire truck). In other embodiments, the servo motor 24 can be operated with an alternating current (AC) power supply (e.g., a generator or alternator of a fire truck or a mains power supply in a building).

In some embodiments, the FPS 2 and/or the servo motor 24 can be powered by external power sources 110 providing different voltages. The voltages can include one or more of 12 Volts, 24 Volts, 48 Volts, 120 Volts, and 240 Volts. In some embodiments, the stator windings 94 of the servo motor 24 can be adapted to a specific voltage. In some embodiments, the stator windings 94 can be adapted so that the servo motor 24 can operate with more than one power source (e.g., with a DC power supply or an AC power supply). Other embodiments can include different input power stages that allow the servo motor 24 to selectively operate with different voltages and/or power sources. For example, if the fire-extinguishing system 1 is used as a stationary unit for a sprinkler system in a building, the servo motor 24 operating the foam pump 22 can be driven by the 120 Volts AC mains power supply. If mains power is lost, the fire-extinguishing system 1 can automatically switch to a 12 Volts DC battery power supply to continue the fire-extinguishing operation.

Figure 12:
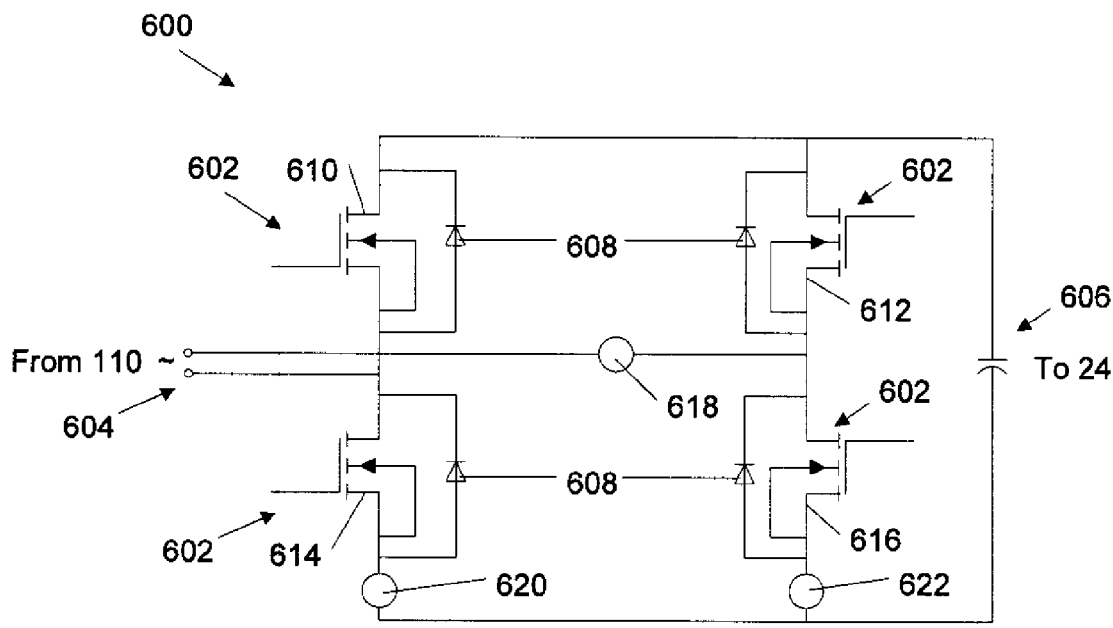
FIG. 12 is a schematic block diagram of a rectification bridge according to one embodiment of the invention.

FIG. 12 illustrates a rectification bridge 600 according to one embodiment of the invention. The rectification bridge 600 can be used to operate the servo motor 24 with an AC power supply. The rectification bridge 600 can include two or more transistors 602, an AC bus 604, and a DC bus 606. The AC bus 604 can connect to the external power supply 110. The DC bus 606 can be used to supply power to the servo motor 24. The transistors 602 can each include an intrinsic diode 608. In some embodiments, the transistors 602 can include metal oxide semiconductor field effect transistors (MOSFETs). In some embodiments, the transistors 602 can be N-type MOSFETs, while in other embodiments, the transistors 602 can be P-type MOSFETs. In some embodiments, the transistors 602 can include a first transistor 610, a second transistor 612, a third transistor 614, and a fourth transistor 616 configured in an H-bridge.

In some embodiments, the controller 10 can sense an incoming current $I_{AC}$ at a first location 618 on the AC bus 604. In other embodiments, the controller 10 can sense the incoming current $I_{AC}$ at a second location 620 along with a third location 622 of the rectification bridge 600. Sensing the incoming current $I_{AC}$ of the rectification bridge 600 can result in a much higher level of electrical noise immunity instead of, for example, sensing voltages. If the incoming current $I_{AC}$ is below a threshold current $I_{limit}$, the intrinsic diodes 608 can be used to rectify the incoming current $I_{AC}$. If the incoming current $I_{AC}$ is above the threshold current $I_{limit}$, the transistors 602 can be used to rectify the incoming current $I_{AC}$. To rectify the incoming current $I_{AC}$, the transistors 602 can be turned on by control signals from the controller 10. The rectification bridge 600 can provide the correct timing for the switching of the transistors 602. In some embodiments, the control current can prevent a discharge of the DC bus 606 and/or a shortening of the AC bus 604. By sensing $I_{AC}$ instead of sensing voltages, the control circuitry can have a much higher level of electrical noise immunity.

In some embodiments, a voltage drop across the transistors 602 can be lower than a voltage drop across the intrinsic diodes 608. As a result, the switching of the transistors 602 can limit the power losses of the rectification bridge 600, if the incoming current $I_{AC}$ exceeds the threshold current $I_{limit}$. In some embodiments, the threshold current $I_{limit}$ can be low enough to prevent the rectification bridge 600 from overheating due to the power losses of the intrinsic diodes 608, but high enough to provide substantial immunity to interference and noise on the AC bus 604. The rectification bridge 600 can have much lower power losses than a conventional rectification bridge including diodes only. As a result, the use of the rectification bridge 600 can enable a higher efficiency and an operation in higher ambient temperatures. In some embodiments, the rectification bridge 600 can limit the power losses to about 30 Watts at an ambient temperature of about 70° C. (160° F.). In some embodiments, the threshold current $I_{limit}$ can include hysteresis to increase an immunity to the noise on the AC bus 604.

Figure 13:
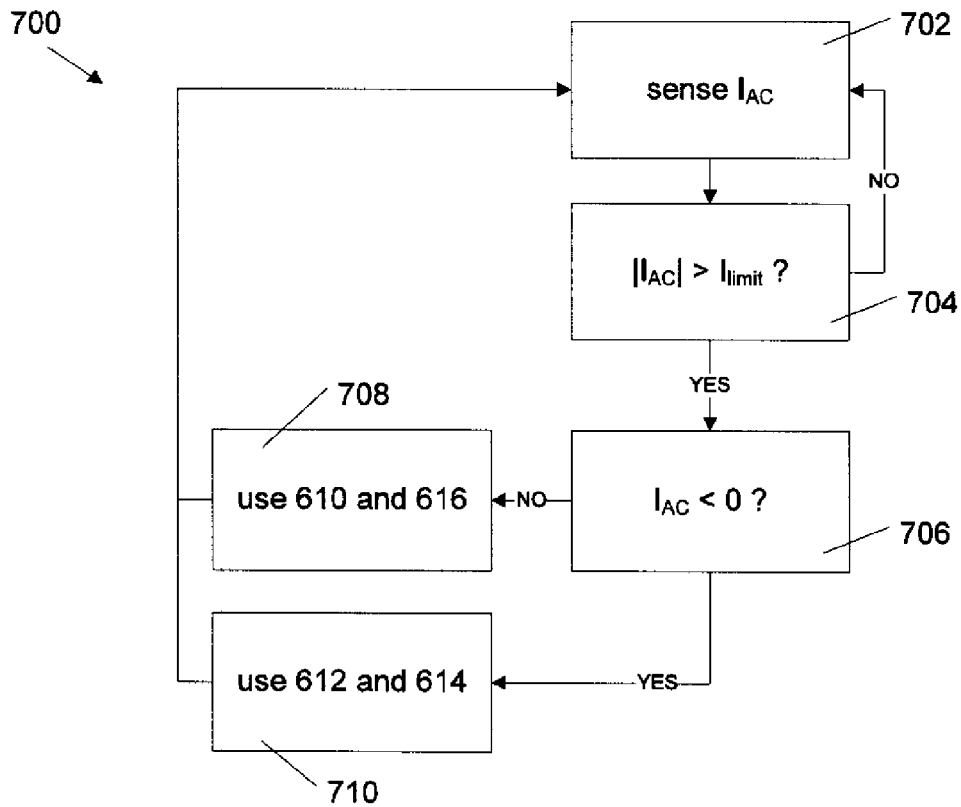
FIG. 13 is a flow chart of an operation of the rectification bridge of FIG. 11.

FIG. 13 illustrates a rectification method 700 according to one embodiment of the invention. The incoming current $I_{AC}$ can be sensed (at step 702). If the absolute value of the incoming current $I_{AC}$ is below the current threshold $I_{limit}$ (at step 704), the intrinsic diodes 608 can rectify the incoming current $I_{AC}$ and the rectification method 700 can be restarted (at step 702) with sensing the incoming current $I_{AC}$. If the absolute value of the incoming current $I_{AC}$ is above the current threshold (at step 704), the controller 10 can determine (at step 706) whether the incoming current $I_{AC}$ is negative. If the incoming current $I_{AC}$ is positive, the controller 10 can supply (at step 708) the control current to the transistors 602. In some embodiments, the controller 10 can use the first transistor 610 and the fourth transistor 616, which can be positioned diagonally across from one another in the rectification bridge 600. If the incoming current $I_{AC}$ is negative, the controller 10 can supply (at step 710) the control current to the transistors 602. In some embodiments, the controller 10 can use the second transistor 612 and the third transistor 614, which can be positioned diagonally across from one another in the rectification bridge 600. After the step 708 and/or the step 710, the rectification method 700 can be restarted by sensing the incoming current $I_{AC}$ so that the intrinsic diodes 608 can be substantially immediately used for the rectification, if the incoming current $I_{AC}$ drops below the current threshold $I_{limit}$.

Although the fire-extinguishing system 1 is described herein as having only a single FPS 2, the fire-extinguishing system 1 can include two or more additive supply systems. Foamants can be introduced into one or several water supplies and individual flow rates can be monitored by a single controller 10, but can alternatively be monitored by two or more controllers. In some embodiments, the fire-extinguishing system 1 can include other additive supply systems powered by non-electric motors (e.g., hydraulic motors).

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A fire-extinguishing system for injecting foamant into a stream of water, the system comprising:
   a flow meter determining a water flow rate of the stream of water;
   a foam pump having an inlet coupled to a supply of foamant and having an outlet coupled to the stream of water; and
   a servo motor driving the foam pump,
   the servo motor including a sensor to measure rotor position in order to determine at least one of a rotor shaft speed and a rotor shaft torque,
   an operating speed of the servo motor being controlled by a controller using closed-loop control based on the water flow rate and at least one of the rotor shaft speed and the rotor shaft torque.

2. The fire-extinguishing system of claim 1, wherein the fire-extinguishing system is one of a stationary system and a mobile system.

3. The fire-extinguishing system of claim 1, wherein the operating speed of the servo motor is based on a foamant flow rate.

4. The fire-extinguishing system of claim 3, wherein the foamant flow rate is measured by a second flow meter.

5. The fire-extinguishing system of claim 3, wherein the foamant flow rate is calculated based on a displacement of the foam pump.

6. The fire-extinguishing system of claim 1, and further comprising a selector valve positioned downstream of the outlet, the selector valve having a first position allowing foamant to enter the stream of water and a second position allowing the foamant to exit the fire-extinguishing system without being introduced into the stream of water.

7. The fire-extinguishing system of claim 6, wherein the selector valve is automatically operated to purge air in order to prime the foam pump.

8. The fire-extinguishing system of claim 7 wherein the selector valve is an electric calibration injection valve.

9. The fire-extinguishing system of claim 1, wherein the controller identifies a viscous property of foamant based on the motor shaft torque and calibration values.

10. The fire-extinguishing system of claim 1, wherein the servo motor has a back electromagnetic force constant of at least about 3.5 volts root mean squared per kilo revolutions per minute for a direct current power source of about 12 volts.

11. The fire-extinguishing system of claim 1, wherein the servo motor has a back electromagnetic force constant of at least about 46 volts root mean squared per kilo revolutions per minute for a direct current power source of about 160 volts.

12. The fire-extinguishing system of claim 1, wherein a rotor shaft angle is used to compute the rotor shaft speed of the servo motor.

13. The fire-extinguishing system of claim 1, wherein the foam pump is a positive displacement pump.

14. The fire-extinguishing system of claim 1, wherein the foam pump includes a piston, and the controller modifies the operating speed of the servo motor based on the piston position of the foam pump.

15. The fire-extinguishing system of claim 1, and further comprising a load dump protection circuit to help prevent damage to at least one of the controller and the servo motor from over-voltage peaks.

16. The fire-extinguishing system of claim 1, wherein the servo motor is powered by one of a DC power source and an AC power source.

17. The fire-extinguishing system of claim 1, wherein the servo motor is capable of being powered by at least one of a plurality of voltages and a plurality of power sources.

18. The fire-extinguishing system of claim 1, and further comprising a power management system capable of substantially preventing over-heating of the servo motor.

19. The fire-extinguishing system of claim 18, wherein the power management system provides a variable duty cycle to the servo motor.

20. The fire-extinguishing system of claim 18, wherein the power management system includes tailored pulse shapes.

21. The fire-extinguishing system of claim 1, and further comprising a water pump positioned in the stream of water.

22. The fire-extinguishing system of claim 21, wherein the foamant is introduced one of upstream and downstream of the water pump.

23. The fire-extinguishing system of claim 1, wherein the foam pump can be automatically started.

24. The fire-extinguishing system of claim 1, wherein the controller can stop the servo motor when a condition is detected by the controller.

25. The fire-extinguishing system of claim 24, wherein the condition detected by the controller includes at least one of a current fold back condition, an over-temperature condition, a stall condition, and a low foamant supply condition.

26. The fire-extinguishing system of claim 1, wherein the sensor measures a current draw of the servo motor.

27. The fire-extinguishing system of claim 26, wherein the rotor shaft torque is computed based on the current draw and a torque constant of the servo motor.

28. The fire-extinguishing system of claim 27, wherein the torque constant is mapped to compensate for temperature variations.

* * * * *